United States Patent
Idreos et al.

(10) Patent No.: US 11,392,644 B2
(45) Date of Patent: Jul. 19, 2022

(54) OPTIMIZED NAVIGABLE KEY-VALUE STORE

(71) Applicant: PRESIDENT AND FELLOWS OF HARVARD COLLEGE, Cambridge, MA (US)

(72) Inventors: Stratos Idreos, Cambridge, MA (US); Niv Dayan, Somerville, MA (US); Manoussos Gavriil Athanassoulis, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 180 days.

(21) Appl. No.: 16/433,075

(22) PCT Filed: Jan. 9, 2018

(86) PCT No.: PCT/US2018/012880
§ 371 (c)(1),
(2) Date: Jun. 6, 2019

(87) PCT Pub. No.: WO2018/129500
PCT Pub. Date: Jul. 12, 2018

(65) Prior Publication Data
US 2020/0057782 A1    Feb. 20, 2020

Related U.S. Application Data

(60) Provisional application No. 62/481,155, filed on Apr. 4, 2017, provisional application No. 62/444,022, filed on Jan. 9, 2017.

(51) Int. Cl.
*G06F 16/30* (2019.01)
*G06F 16/901* (2019.01)
(Continued)

(52) U.S. Cl.
CPC ......... *G06F 16/9014* (2019.01); *G06F 3/067* (2013.01); *G06F 16/2246* (2019.01); *G06F 16/9535* (2019.01)

(58) Field of Classification Search
CPC ............ G06F 16/9014; G06F 16/2246; G06F 16/9535
(Continued)

(56) References Cited

U.S. PATENT DOCUMENTS

2015/0310053 A1    10/2015 Kim
2015/0347477 A1*   12/2015 Esmet ................. G06F 16/2246
                                                  707/744
(Continued)

OTHER PUBLICATIONS

International Search Report and Written Opinion for International Application No. PCT/US18/12880 dated Mar. 29, 2018, 7 pages.

*Primary Examiner* — Sana A Al-Hashemi
(74) *Attorney, Agent, or Firm* — Morgan, Lewis & Bockius LLP

(57) ABSTRACT

Embodiments of the invention utilize an improved LSM-tree-based key-value approach to strike the optimal balance between the costs of updates and lookups with any given main memory budget. The improved approach involves allocating memory to Bloom filters differently across different levels so as to minimize the sum of the false positive rates associated with the Bloom filters. In addition, the improved approach may predict the impact of the system design parameter(s) and/or environmental parameter(s) on the lookup performance. Subsequently, the improved approach may "self-tune" the system design parameter(s) and/or environment parameter(s) to maximize the throughput.

16 Claims, 26 Drawing Sheets

(51) Int. Cl.
*G06F 16/22* (2019.01)
*G06F 16/9535* (2019.01)
*G06F 3/06* (2006.01)

(58) Field of Classification Search
USPC ........ 707/609, 687, 705, 769, 790, 813, 821
See application file for complete search history.

(56) References Cited

U.S. PATENT DOCUMENTS

| | | |
|---|---|---|
| 2016/0063021 A1* | 3/2016 | Morgan ................ G06F 16/182 |
| | | 707/754 |
| 2016/0132028 A1 | 5/2016 | Sayyarrodsari et al. |
| 2016/0134503 A1* | 5/2016 | Watson ................ H04L 43/026 |
| | | 709/224 |
| 2016/0371297 A1 | 12/2016 | Okun et al. |
| 2017/0068675 A1* | 3/2017 | Hazel .................... G06F 16/252 |
| 2017/0351543 A1* | 12/2017 | Kimura ............... G06F 16/9024 |
| 2018/0004798 A1* | 1/2018 | Kimura ............... G06F 12/0238 |
| 2018/0089244 A1* | 3/2018 | Velayudhan Pillai .. G06F 16/23 |

* cited by examiner

| TECHNIQUE | POINT LOOKUP COST | UPDATE COST |
|---|---|---|
| (1) LOG | $O\left(\frac{N \cdot E}{M_{buffer}} \cdot e^{\frac{M_{filters}}{N}}\right)$ | $O\left(\frac{1}{B}\right)$ |
| (2) TIERING | $O\left(T \cdot \log_T\left(\frac{N \cdot E}{M_{buffer}}\right) \cdot e^{\frac{M_{filters}}{N}}\right)$ | $O\left(\frac{1}{B} \cdot \log_T\left(\frac{N \cdot E}{M_{buffer}}\right)\right)$ |
| (3) LEVELING | $O\left(\log_T\left(\frac{N \cdot E}{M_{buffer}}\right) \cdot e^{\frac{M_{filters}}{N}}\right)$ | $O\left(\frac{1}{B} \cdot \log_T\left(\frac{N \cdot E}{M_{buffer}}\right)\right)$ |
| (4) SORTED ARRAY | $O\left(e^{\frac{M_{filters}}{N}}\right)$ | $O\left(\frac{1}{B} \cdot \frac{N \cdot E}{M_{buffer}}\right)$ |

FIG. 3A

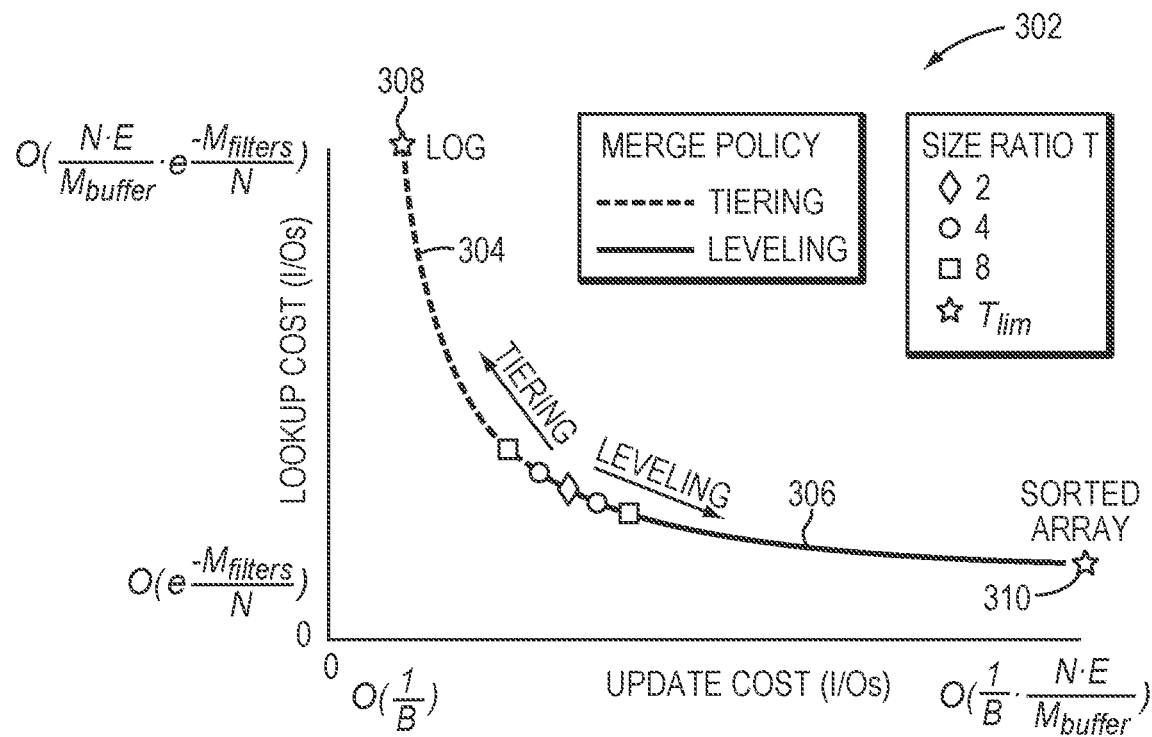

FIG. 3B

| TERM | DESCRIPTION | UNIT |
|---|---|---|
| $p_i$ | FALSE POSITIVE RATE (FPR) FOR FILTERS AT LEVEL $i$ | |
| $R$ | WORST-CASE ZERO-RESULT POINT LOOKUP COST | I/O |
| $R_{filtered}$ | WORST-CASE ZERO-RESULT POINT LOOKUP COST TO LEVELS WITH FILTERS | I/O |
| $R_{unfiltered}$ | WORST-CASE ZERO-RESULT POINT LOOKUP COST TO LEVELS WITH NO FILTERS | I/O |
| $V$ | WORST-CASE NON-ZERO-RESULT POINT LOOKUP COST | I/O |
| $W$ | WORST-CASE UPDATE COST | I/O |
| $Q$ | WORST-CASE RANGE LOOKUP COST | I/O |
| $M_{threshold}$ | VALUE OF $M_{filters}$, BELOW WHICH $p_L$ (FPR AT LEVEL L) CONVERGES TO 1 | bits |
| $\phi$ | COST RATIO BETWEEN A WRITE AND A READ I/O TO PERSISTENT STORAGE | |
| $s$ | PROPORTION OF ENTRIES IN A RANGE LOOKUP | |
| $L_{filtered}$ | NUMBER OF LEVELS WITH BLOOM FILTERS | |
| $L_{unfiltered}$ | NUMBER OF LEVELS WITHOUT BLOOM FILTERS | |
| $\hat{M}$ | AMOUNT OF MAIN MEMORY TO DIVIDE AMONG FILTERS AND BUFFER | bits |

FIG. 5B

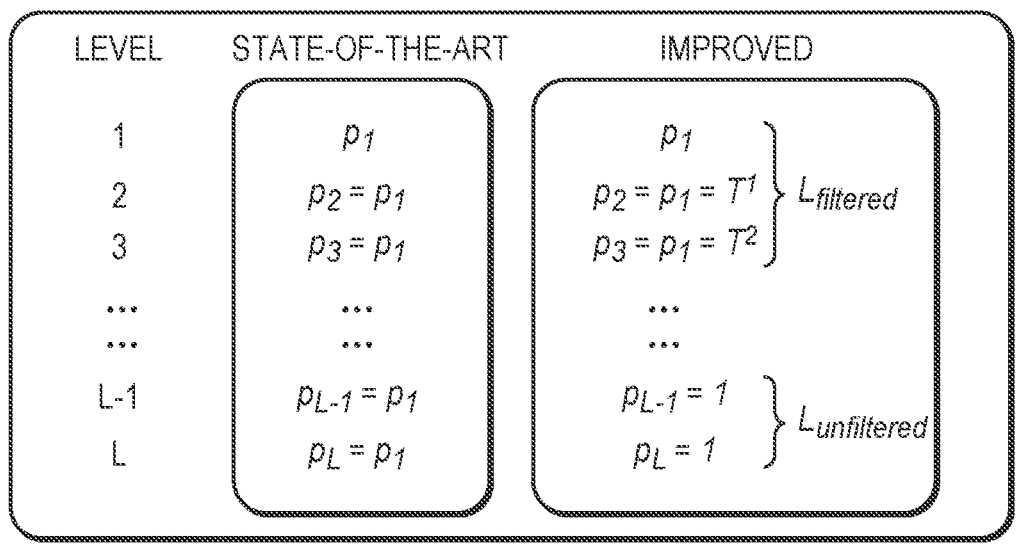

FIG. 5C

| MERGE POLICY | UPDATE COST (W) (a) | STATE OF THE ART LOKUP COST | |
|---|---|---|---|
| | | $M_{filters} \leq M_{threshold}$ (b) | $M_{threshold} \leq M_{filters}$ (c) |
| (1) TIERING ($T=T_{lim}$) | $O(\frac{1}{B})$ | $O(\frac{N \cdot E}{M_{buffer}})$ | $O(\frac{N \cdot E}{M_{buffer}} \cdot e^{-\frac{M_{filters}}{N}})$ |
| (2) TIERING ($2 \leq T < T_{lim}$) | $O(\frac{1}{B} \cdot \log_T(\frac{N \cdot E}{M_{buffer}}))$ | $O(T \cdot \log_T(\frac{N \cdot E}{M_{buffer}}))$ | $O(T \cdot \log_T(\frac{N \cdot E}{M_{buffer}}) \cdot e^{-\frac{M_{filters}}{N}})$ |
| (3) LEVELING ($2 \leq T < T_{lim}$) | $O(\frac{1}{B} \cdot \log_T(\frac{N \cdot E}{M_{buffer}}))$ | $O(\log_T(\frac{N \cdot E}{M_{buffer}}))$ | $O(\log_T(\frac{N \cdot E}{M_{buffer}}) \cdot e^{-\frac{M_{filters}}{N}})$ |
| (4) LEVELING ($T=T_{lim}$) | $O(\frac{1}{B} \cdot \frac{N \cdot E}{M_{buffer}})$ | $O(1)$ | $O(e^{-\frac{M_{filters}}{N}})$ |

| IMPROVED LOKUP COST (R) | |
|---|---|
| $\frac{M_{threshold}}{T^L} \leq M_{filters} \leq M_{threshold}$ (d) | $M_{threshold} \leq M_{filters}$ (e) |
| $O(\frac{N \cdot E}{M_{buffer}})$ | $O(\frac{N \cdot E}{M_{buffer}} \cdot e^{-\frac{M_{filters}}{N}})$ |
| $O(T \cdot \log_T(\frac{N \cdot E}{M_{filters}}))$ | $O(T \cdot e^{-\frac{M_{filters}}{N}})$ |
| $O(\log_T(\frac{N \cdot E}{M_{filters}}))$ | $O(e^{-\frac{M_{filters}}{N}})$ |
| $O(1)$ | $O(e^{-\frac{M_{filters}}{N}})$ |

FIG. 7

| TERM | DEFINITION | UNITS |
|---|---|---|
| $v$ | RATIO OF NON-ZERO-RESULT POINT LOOKUPS TO ZERO-RESULT POINT LOOKUPS | |
| $N$ | WEIGHTED POINT LOOKUP COST | I/O |
| $z$ | PERCENTAGE OF POINT LOOKUPS IN WORKLOAD | % |
| $w$ | PERCENTAGE OF UPDATES IN WORKLOAD | % |
| $q$ | PERCENTAGE OF RANGE LOOKUPS IN WORKLOAD | % |
| $\hat{M}$ | MAIN MEMORY TO DIVIDE BETWEEN THE FILTERS AND BUFFER | bits |
| $\theta$ | AVERAGE OPERATION COST IN TERMS OF LOOKUPS | I/O / op |
| $\Omega$ | TIME TO READ A PAGE FROM PERSISTENT STORAGE | sec / I/O |
| $\tau$ | WORST-CASE THROUGHPUT | op / sec |

FIG. 12A

```
ALGORITHM 1: Holistic Optimal Tuning
HolisticTuning (M̂, z, v, q, w, s, E, N, φ, B)
    min_cost = ∞;
    tuning {policy, T};
    for int L = 1; L ≤ ⌈log₂ (N/B)⌉; L++ do
        T = N^(1/L);
        // Check cost for leveling
        M_f = optimal Memory For Filters (M̂, T, leveling; z, v, q, w, s, E, N, φ, B);
        M_b = M̂ - M_f;
        current_cost_L = cost_L (T, M_b, M_f) // Equation 22
        if current_cost_L < min_cost then
            tuning.T = T;
            tuning.policy = leveling;
            min_cost = current_cost_L;
        end
        // Check cost for tiering
        M_f = optimal Memory For Filters (M̂, T, tiering; z, v, q, w, s, E, N, φ, B);
        M_b = M̂ - M_f;
        current_cost_T = cost_T (T, M_b, M_f) // Equation 23
        if current_cost_T < min_cost then
            tuning.T = T;
            tuning.policy = tiering;
            min_cost = current_cost_T;
        end
    end
    return tuning;
```

FIG. 13B

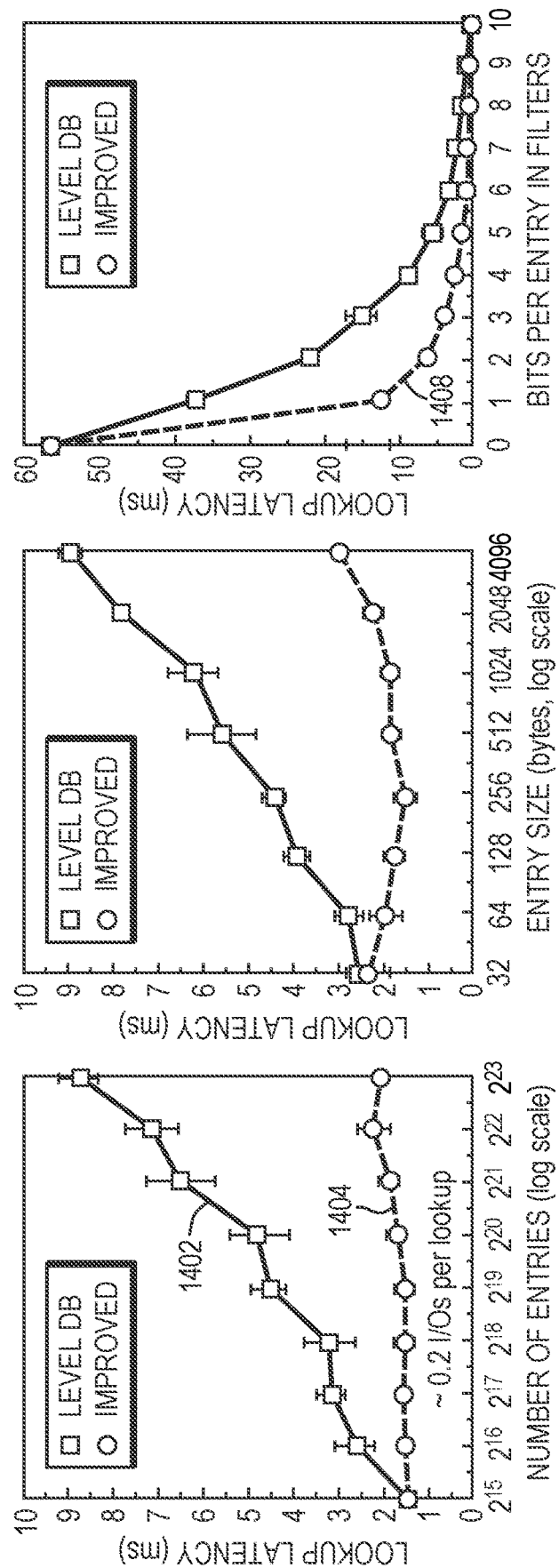

OPTIMIZED NAVIGABLE KEY-VALUE STORE

CROSS-REFERENCE TO RELATED APPLICATION

This application is a U.S. National Phase Application of PCT/US2018/012880, filed Jan. 9, 2018, which claims priority to, and the benefit of, U.S. Provisional Patent Application No. 62/444,022, filed on Jan. 9, 2017, and U.S. Provisional Patent Application No. 62/481,155, filed on Apr. 4, 2017. The foregoing applications are hereby incorporated by reference in their entireties.

GOVERNMENT FUNDING

The present invention was supported in part by contract no. 1452595 from the National Science Foundation. The U.S. Government has certain rights in the invention.

FIELD OF THE INVENTION

The field of the invention relates, generally, to key-value stores and, more particularly, to the key-value stores involving log-structured merge-trees ("LSM-trees").

BACKGROUND

Very large data stores, such as those that support business intelligence and "big data" applications, are often organized as key-value stores. Unlike the more common "transactional" databases used for routine business applications, key-value stores are designed to quickly retrieve indexed data items. Because of their size, key-value stores may utilize a hierarchy of storage options reflecting the trade-off between access speed and cost per bit of storage. Given a large dataset that receives frequent additions ("writes") and the need to index that dataset to support queries, it can be challenging to organize the tiers of available storage for optimum efficiency and performance.

LSM tree is a data structure with performance characteristics that make it attractive for providing indexed access to files with high insert volume. LSM trees, like other search trees, maintain key-value pairs, i.e., sets of two linked data items: a key, which is a unique identifier for some item of data, and the value, which is either the data that is identified or a pointer to the location of that data. LSM trees maintain data in two or more separate structures, each of which is optimized for its respective underlying storage medium; data is synchronized between the two structures efficiently, in batches. More specifically, LSM trees cascade data over time from smaller, higher performing (but more expensive) storage facilities to larger, slower and less expensive facilities. The LSM tree later sort-merges runs in order to (1) remove obsolete entries to reclaim space, and (2) bound the number of runs that a lookup has to probe. Runs are organized into levels of exponentially increasing sizes. A "point lookup" starts from the smallest level and terminates when it finds the target key, whereas a "range lookup" accesses the relevant key range across all runs at all levels to form a complete result.

To speed up lookups on individual runs, modern designs maintain two additional data structures in main memory. First, for every run there is a set of fence pointers that contain the first key of every disk page of the run; this allows lookups to access a particular key within a run with just one I/O. Second, for every run there exists a Bloom filter, which probabilistically allows a run to be skipped if it does not contain the target key. (A Bloom filter is a probabilistic data structure used to test whether an element is a member of a set. False positive matches are possible, but false negatives are not—i.e., query returns either "possibly in set" or "definitely not in set." The more elements that are added to the set, the larger the probability of false positives will be.)

LSM-based key-value stores exhibit an intrinsic trade-off among the I/O costs of updates, point lookups, and range lookups, as well as the cost of storage (measured as space amplification, i.e., the amount of storage space occupied by obsolete entries). The reason is that they perform expensive merge operations in order to (1) bound the number of runs that a lookup has to probe, and (2) remove obsolete entries to reclaim space. Given this performance trade-off and the many parameters that can affect it, determining how best to organize storage and retrieval operations to maximize overall performance in a key-value store represents a significant challenge.

SUMMARY

Embodiments of the present invention provides an improved key-value approach based on LSM-trees that advantageously strikes the optimal balance between the costs of updates and lookups with any given main memory budget. The improved approach involves allocating memory to Bloom filters differently across different tree levels so as to minimize the sum of the false positive rates (FPRs) associated with the Bloom filters. In one implementation, the FPR of each Bloom filter is set to be proportional to the number of entries in the memory access run to which the Bloom filter corresponds; this indicates that the FPRs for shallower levels in the LSM-tree exponentially decrease. Because the same amount of memory can have a higher impact in reducing the FPR for smaller runs, this approach may advantageously shave a factor of $O(L)$ (where L is the number of LSM-tree levels) from the worst-case lookup cost as well as allow the lookup cost to scale better with the data volume (as compared with conventional key-value systems based on LSM-trees). In addition, because the improved approach may remove the dependence of the lookup cost on the buffer size of LSM-tree, the contention in how to allocate main memory between the filters and the buffer may be removed, thereby simplifying system tuning.

In various embodiments, the improved key-value approach can predict how changing a system design parameter (e.g., the size ratio among the levels, the merge policy, the FPRs assigned to the Bloom filters across different levels, and/or the allocation of main memory between the buffer and the filters) or an environmental parameter (e.g., the main memory budget, the proportion of reads and writes in the workload, the number and/or size of data entries, the underlying storage medium, etc.) would impact worst-case performance. This may be achieved by closed-form models for the worst-case I/O costs of lookups and updates in terms of the LSM tree design parameters. For example, the closed-form models may predict how a change in main memory utilization or allocation may reposition the Pareto curve in the LSM-tree design space. (As further described below, a Pareto curve plots the cost trade-off between database lookups and updates. Along the Pareto curve, the lookup cost cannot be improved without sacrificing update cost, and vice versa). Thus, the improved approach may "self-tune" the system design parameters and/or environment parameters to maximize the worst-case throughput. In various embodiments, this is achieved by, first, using asymptotic analysis to map the design space and thereby devise a rule for allocation of main memory between the buffer and the filters; and modeling worst-case throughput with respect to (1) the model for the lookup cost and update cost, (2) the proportion of lookups and updates in the workload, and (3) the costs of reads and writes to persistent storage.

Accordingly, in one aspect, the invention pertains to a database system including a main memory having volatile storage and including multiple Bloom filters, each associated with a memory access run; a secondary store having nonvolatile storage for storing files; memory containing an LSM tree providing indexed access to files stored in the memory and the secondary store, the LSM tree being organized into levels and indexing the files as key-value pairs; and a processor for writing files to and reading files from the main memory and the secondary store in runs, each having a size. In one implementation, the processor is configured to limit the runs associated with a read or write operation in accordance with the Bloom filters. In addition, the Bloom filters are tuned to minimize a sum of false positive rates thereacross.

In various embodiments, each of the files includes multiple data entries and each of the runs (i) is associated with a specific level and (ii) includes approximately equal numbers of data entries. In addition, each of the Bloom filters associated with runs at a particular level is assigned the same false positive rate. The false positive rates across levels may be assigned so as to minimize an amount of memory utilized by the Bloom filters. In addition, the processor may be further configured to determine a number of the levels to which the Bloom filters are allocated; the false positive rate for each number of the levels may be assigned based on a capacity thereof In one implementation, the false positive rate assigned to each Bloom filter is proportional to a number of data entries in the memory access run corresponding to the Bloom filter.

The processor may be further configured to model an average number of the memory access runs probed by a lookup for a target key. The Bloom filters may be tuned based at least in part on the modeled number. In some embodiments, the average number of the memory access runs corresponds to the sum of the false positive rates. Additionally or alternatively, the processor may be further configured to compute the first cost associated with a zero-result lookup for a target key and the second cost associated with a non- zero-result lookup for the target key. The Bloom filters may be tuned based at least in part on the computed first and second costs. In addition, the false positive rates across the levels may be assigned so as to minimize the first and second costs.

In various embodiments, the processor is further configured to computationally predict relationships between one or more environmental parameters (e.g., a main memory budget, a proportion of reads and writes in a workload, a number of data entries associated with the files, and/or a size of the data entries) and a lookup cost for a target key. The Bloom filters are tuned based at least in part on the predicted relationships. Additionally or alternatively, the processor may be further configured to predict relationships between one or more system design parameters (e.g., a size ratio among the levels of the LSM tree, a merge policy, the false positive rates assigned to the Bloom filters across different levels, and/or an allocation of the main memory between the memory and the Bloom filters) and a lookup cost for a target key. The Bloom filters may be tuned based at least in part on the predicted relationship. In one implementation, the processor is further configured to holistically tune the system design parameter(s) so as to minimize the lookup cost.

In another aspect, the invention relates to a method for providing an improved key-value storing system. In various embodiments, the method includes providing a main memory having volatile storage and including multiple Bloom filters, each associated with a memory access run; providing a secondary store having nonvolatile storage for storing files; providing memory containing an LSM tree having indexed access to files stored in the memory and the secondary store, the LSM tree being organized into levels and indexing the files as key-value pairs; using a processor to write files to and read files from the main memory and the secondary store in runs each having a size, the processor being configured to limit the runs associated with a read or write operation in accordance with the Bloom filters; and tuning the Bloom filters to minimize a sum of false positive rates thereacross.

In some embodiments, each of the files includes multiple data entries and each of the runs (i) is associated with a specific level and (ii) includes approximately equal numbers of data entries. In addition, each of the Bloom filters associated with runs at a particular level is assigned the same false positive rate. The false positive rates across levels may be assigned so as to minimize an amount of memory utilized by the Bloom filters. In one implementation, the method further includes determining a number of the levels to which the Bloom filters are allocated, and assigning the false positive rate for each number of the levels based at least in part on a capacity thereof. In addition, the method may include proportionally assigning the false positive rate to each Bloom filter based on a number of data entries in the memory access run corresponding to the Bloom filter.

The method may further include modeling an average number of the memory access runs probed by a lookup for a target key. The Bloom filters may be tuned based at least in part on the modeled number. In some embodiments, the average number of the memory access runs corresponds to the sum of the false positive rates. Additionally or alternatively, the method may include computing the first cost associated with a zero-result lookup for a target key and the second cost associated with a non- zero-result lookup for the target key. The Bloom filters may be tuned based at least in part on the computed first and second costs. In addition, the method may include assigning the false positive rates across the levels so as to minimize the first and second costs.

In various embodiments, the method further includes computationally predicting relationships between one or more environmental parameters (e.g., a main memory budget, a proportion of reads and writes in a workload, a number of data entries associated with the files, and/or a size of the data entries) and a lookup cost for a target key. The Bloom filters is tuned based at least in part on the predicted relationships. Additionally or alternatively, the method may include predicting relationships between one or more system design parameters (a size ratio among the levels of the LSM tree, a merge policy, the false positive rates assigned to the Bloom filters across different levels, and/or an allocation of the main memory between the memory and the Bloom filters) and a lookup cost for a target key. The Bloom filters may be tuned based at least in part on the predicted relationship. In one implementation, the method further includes holistically tuning the system design parameter(s) so as to minimize the lookup cost Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which:

FIG. 3A depicts an analysis of conventional LSM-tree systems;

FIG. 3B depicts an LSM-tree design space in accordance with various embodiments;

FIG. 5B depicts a list of terms and the descriptions associated therewith used herein;

FIG. 5C is an overview of how the improved approach allocates false positive rates to Bloom filters in proportion to the number of key-value pairs in a given level in accordance with various embodiments;

FIG. 7 depicts the worst-case lookup cost and update cost for various models;

FIG. 12A depicts definitions of the terms utilized in a tuning method in accordance with various embodiments;

FIG. 13B is an exemplary algorithm for the holistic tuning approach in accordance with various embodiments;

FIGS. 14A-14F depict a comparison of the lookup cost using conventional systems and the improved approach in accordance with various embodiments.

DETAILED DESCRIPTION

Embodiments of the present invention relate to an improved key-value approach that advantageously strikes or approaches the optimal balance between the costs of updates and lookups with a given main memory budget. The improved key-value approach involves allocating memory to Bloom filters differently across different tree levels, predicting how change in a design decision or an environmental parameter would impact worst-case performance, and "self-tuning" values of the system parameters to maximize the worst-case throughput as further described below.
Technical Terms and Environment
1) LSM Tree An LSM-tree stores key-value pairs; a value is an application object, and a key identifies an application object and enables retrieving it. The keys and values described herein are stored inside the LSM-tree, but it should be understood that values may be stored separately, e.g., in a log. For example, large values may be stored outside of the LSM-tree and pointed thereto using fixed-width pointers that are attached to keys. In addition, for ease of reference, all figures depicted herein show only keys, but one of ordinary skill in the art will understand that keys can be thought of as key-value pairs.

2) Buffering Updates

Figure 1:
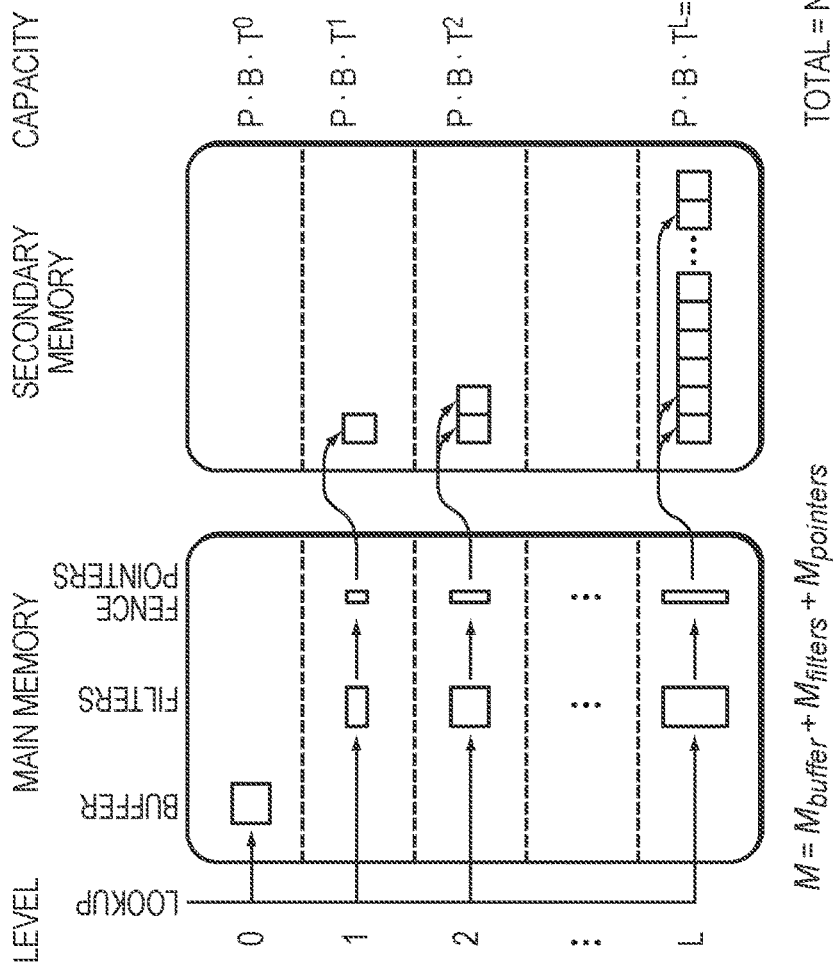
FIG. 1 is an overview of an LSM-tree and a list of terms in accordance with various embodiments.

With reference to FIG. 1, typically, an LSM-tree consists conceptually of L levels; Level 0 refers to an in-memory buffer (which is typically volatile and therefore fast and expensive), and the rest of the levels refer to data in secondary storage (which is typically nonvolatile and therefore slower and cheaper (e.g., disk)). LSM-trees optimize for data insertions, data updates and data deletions (collectively referred to as "updates" herein) by immediately storing them in the buffer at Level 0 without having to access secondary storage. If an update refers to a key that already exists in the buffer, the original entry may be replaced in-place and only the latest one survives. When the buffer fills up, its entries are sorted by keys into an array (or a "run") and flushed to Level 1 in secondary storage. Thus, a run generally specifies one or more files to be written from the buffer to secondary storage and one or more files to be retrieved from secondary storage into the buffer. In fact, storage and retrieval typically occurs at a level more granular than a file, e.g., at the level of a fixed-length contiguous block of memory, such as a page. For ease of presentation, the ensuing discussion refers to file storage and retrieval, but it should be understood that actual storage and retrieval operations may occur at the page or other fragmentary level.

A number of bits of main memory allocated to the buffer are denoted as $M_{buffer}$, $M_{buffer} = P \cdot B \cdot E$, where B represents the number of entries that fit into a disk page, P represents the amount of main memory in terms of disk pages allocated to the buffer, and E represents the average size of data entries. For example, in Level DB the default buffer size is 2 MB.

The runs at Level 1 and/or a higher level are typically immutable. Each Level i has a capacity threshold of $P \cdot B \cdot T^i$ entries, where T represents a tuning parameter denoting the size ratio between the capacities of adjacent levels. Thus, the levels in an LSM-tree have exponentially increasing capacities by a factor of T. The overall number of levels is given as:

$$L = \left\lceil \log_T\left(\frac{N \cdot E}{M_{buffer}} \cdot \frac{T-1}{T}\right) \right\rceil \quad \text{Eq. (1)}$$

In one embodiment, the size ratio T has a limiting value of $T_{lim}$, satisfying:

$$T_{lim} = \frac{N \cdot E}{M_{buffer}}.$$

The value of T can be set anywhere between 2 and $T_{lim}$. As T approaches $T_{lim}$, the number of levels L approaches 1.

3) Merge Operations

Figure 2:
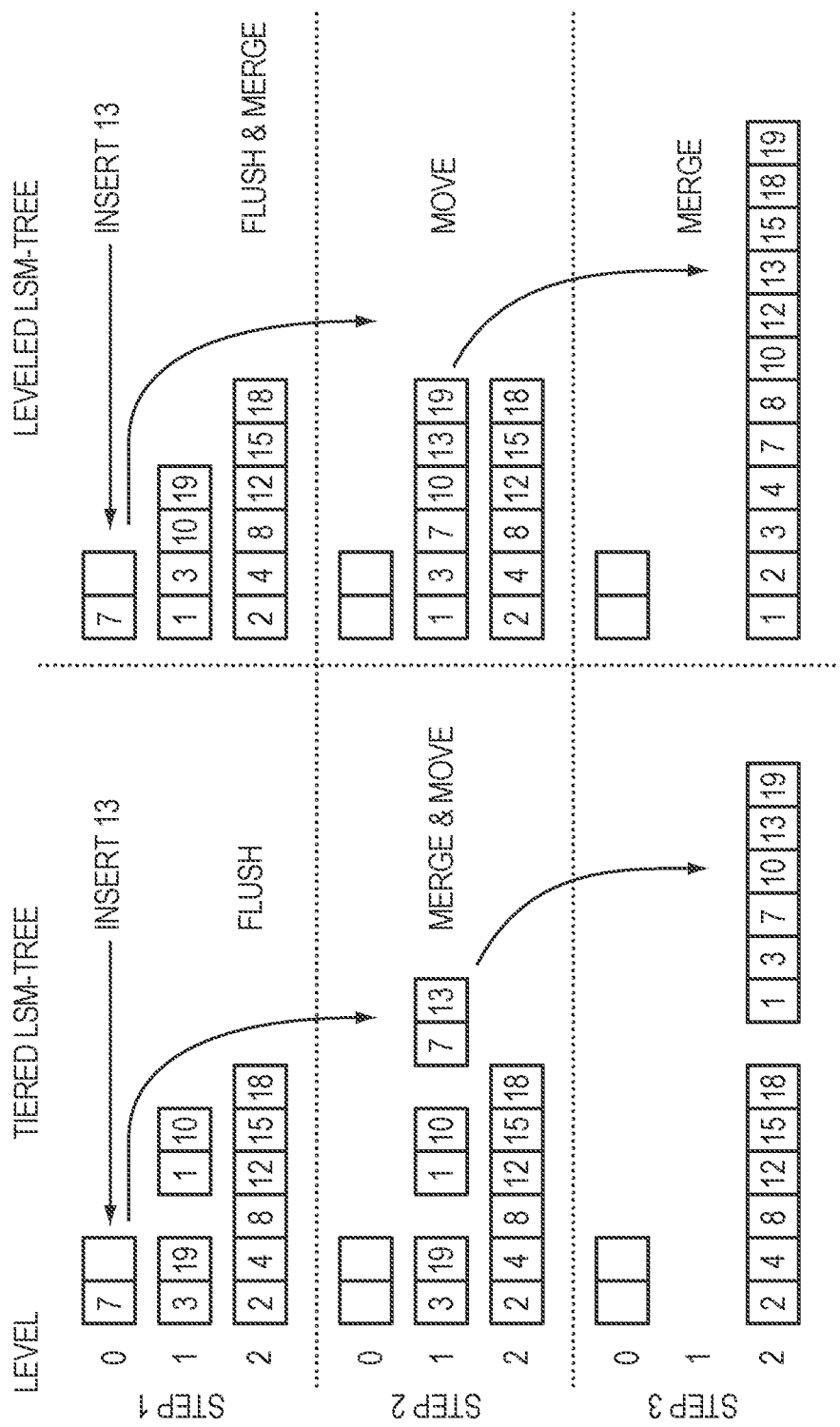
FIG. 2 depicts a tiered LSM-tree and a leveled LSM-tree having the size ratio set to 3 and the number of entries that fit into the buffer set to 2.

To bound the number of runs that a lookup has to probe, in various embodiments, an LSM-tree organizes runs among the different levels based on their sizes and then merges the runs having the similar sizes (i.e., at the same level). Generally, there are two merge policies, leveling and tiering, suitable for optimizing the lookups and updates, respectively. Using leveling, there is at most one run per Level i, and any run that is moved from Level i−1 to Level i is immediately sort-merged with the run at Level i, if one exists. Using tiering, up to T runs can accumulate at Level i, and at that point these runs are sort-merged into a single run and moved to Level i+1. The essential difference between leveling and tiering is that a leveled LSM-tree merges runs more greedily and therefore gives a tighter bound on the overall number of runs that a lookup has to probe, but this comes at the expense of a higher amortized update cost. FIG. 2 depicts a comparison between tiering and leveling when the size ratio T is 3. In some embodiments, when multiple runs that are being sort-merged contain entries with the same key, only the entry from the most recently-created (i.e., the youngest) run is kept because it is the most up-to-date. Thus, the resulting run may be smaller than the cumulative sizes of the original runs. When a merge operation is finished, the resulting run may move to Level i+1 if Level i is at capacity.

4) Lookups

Generally, a point lookup starts from the buffer and traverses the levels from the lowest to the highest number (and the runs within those levels from the youngest to the oldest in the case of tiering). When the point lookup finds the first matching entry it may terminate; there is then no need to look further because entries with the same key at older runs are superseded. A zero-result lookup (i.e., where the target key does not exist) may incur a potentially high I/O cost because the point lookup probes all runs within all levels. In contrast, a range lookup requires sort-merging all runs with an overlapping key range to identify and ignore superseded entries.

5) Probing a Run

Generally, modern LSM-tree designs store an array of the fence pointers in main memory with min/max information for every disk page of every run; this simplifies the process of maintaining a flat array structure and thereby leads to good search performance in memory (e.g., a binary search as each run is sorted). Given that an LSM-tree is on disk, these in-memory binary searches are not in the critical path of performance (but the I/O is). Thus, a lookup initially searches the fence pointers. If it is a point lookup, it then reads the appropriate disk page with one I/O, or if it is a range lookup, it begins a scan from this page. The size of the fence pointers is modest. For example, with 16 KB disk pages and 4 byte pointers, the fence pointers are smaller by about four orders of magnitude than the raw data size. Assuming the amount of main memory occupied by the fence pointers, $M_{pointers}$, is $$FPR = e^{-\frac{bits}{entries} \cdot \ln(2)^2}. \quad \text{Eq. (2)}$$

probing a run is guaranteed to takes O(1) disk I/O for point lookups.

6) Bloom Filters

To speed up point lookups, which are common in practice, each run may have a corresponding Bloom filter in main memory. A Bloom filter is a space-efficient probabilistic data structure used to answer set membership queries. The Bloom filter cannot return a false negative, though it may return a false positive with a tunable FPR. The FPR depends on the ratio between the number of bits allocated to the filter and the number of entries in the set according to the following expression:

$$O\left(\frac{N}{B}\right),$$

If a Bloom filter is partitioned into smaller, equally sized Bloom filters with an equal division of entries among them, the FPR of each one of the new partitioned Bloom filters is asymptotically the same as the FPR of the original filter (though slightly higher in practice). For ease of discussion, we refer to Bloom filters as being non-partitioned, though they can also be partitioned (e.g., per every page of every run) to enable greater flexibility with space management.

A point lookup probes a Bloom filter before accessing the corresponding run in secondary storage. If the filter returns a negative, it indicates that the target key does not exist in the run; the lookup then skips the current run, thereby saving one I/O. If the filter returns a true positive, it indicates that the target key may exist in the run; the lookup may then access the run, find the matching entry, and terminate. Sometimes, however, a false positive may occur, meaning that the lookup wastes one I/O by accessing the run and not finding a matching entry. Because most, if not all, key-value systems based on LSM trees use the same number of bits-per-entry across all Bloom filters, a lookup probes on average $$O\left(e^{-\frac{M_{filters}}{N}}\right)$$

of the runs, where $M_{filters}$ represents the overall amount of main memory allocated to the filters. When $M_{filters}$ approaches 0 or infinity, the term $$O\left(e^{-\frac{M_{filters}}{N}}\right)$$

approaches 1 or 0, respectively. Assuming 10 bits per entry are used for the Bloom filters, the corresponding FPR is about 1%. With this tuning, an average entry size of 128 bytes (which is typical in practice) entails the Bloom filters being about two orders of magnitude smaller than the raw data size.

7) Cost Analysis

In various embodiments, the worst-case I/O cost complexity of updates and lookups for both a tiered and a leveled LSM-tree can be measured and analyzed as further described below. Measurements of the worst-case lookups and updates are defined as measuring an amortized worst-case I/O cost (which accounts for the merge operations that an entry participates in after it is updated) and a zero-result average worst-case I/O cost (which is the expected number of I/Os performed by a lookup to a key that does not exist in the LSM-tree) for updates and lookups, respectively. In one embodiment, the analysis focuses on the zero-result lookups as they are very common in practice (e.g., insert-if-not-exist queries) and they incur the maximum pure I/O overhead (i.e., read I/Os that do not find relevant entries to a lookup). In addition, the worst-case costs of non-zero-result lookups and range lookups for completeness can be modeled as further described below.

In some embodiments, the worst-case lookup cost for a tiered LSM-tree is given by $$O\left(L \cdot T \cdot e^{-\frac{M_{filters}}{N}}\right).$$

This is because there are O(L) levels, O(T) runs per level, the cost of probing each run is one I/O due to the fence pointers, and on average only $$O\left(e^{-\frac{M_{filters}}{N}}\right)$$

of the runs are probed. The worst-case update cost is $$O\left(\frac{L}{B}\right) I/Os.$$

This is because each entry participates in O(L) merge operations (i.e., one per level) and the I/O cost of copying one entry during a merge operation is $$O\left(\frac{1}{B}\right),$$

since each write I/O copies O(B) entries into the new run. Similarly, for a leveled LSM-tree, the worst-case lookup cost is given by $$O\left(L \cdot e^{-\frac{M_{filters}}{N}}\right)$$

as there are O(L) levels, one run per level, the cost of probing a run is one I/O, and $$O\left(e^{-\frac{M_{filters}}{N}}\right)$$

of the runs on average are probed. The worst-case update cost is $$O\left(\frac{T \cdot L}{B}\right),$$

as each update is copied O(T) times per level and through O(L) levels overall.

8) LSM-Tree Design Space

FIGS. 3A and 3B depict a summary of the design space of LSM-trees and the impact on lookup and update costs. These costs generally depend on multiple tuning parameters, including the merge policy (i.e., tiering vs. leveling), the size ratio T between levels, the allocation of main memory among the buffer $M_{buffer}$ and the Bloom filters, and the allocation of $M_{filters}$ among each of the different Bloom filters. In some embodiments, the design space of LSM-trees spans everything between a write-optimized log to a read-optimized sorted array. To understand how to accurately navigate this design space and obtain the exact impact of each design decision, a characteristic of the design space in FIG. 3B and the contention among the various design decisions may be first determined.

9) Tuning the Merge Policy and Size Ratio

FIG. 3B illustrates a relationship 302 between the point lookup cost and update cost for corresponding values of the merge policy and size ratio. In various embodiments, FIG. 3B is created by plugging all combinations of the merge policy and the size ratio into the complexity equations in rows 2 and 3 of FIG. 3A. As depicted, when the size ratio T is set to 2, the complexities of lookup and update costs for tiering (the dotted line 304) and leveling (the solid line 306) are identical (because the two lines meet when the size ratio T is set to 2). As T increases, the two lines 304, 306 grow farther apart in opposing directions. For tiering, as T increases, the update cost decreases, while the lookup cost increases. In contrast, for leveling, as the size ratio T increases, the update cost increases, while the lookup cost decreases. Accordingly, tiering and leveling are complementary approaches for navigating the same trade-off continuum. It should be noted that the curve 302 in FIG. 3B may not be plotted to scale, and in reality the markers may be much closer to the origin O. But the shape of the curve 302 and its limits as depicted are accurate.

In addition, as the size ratio T approaches its limit value $T_{lim}$, the number of levels L approaches 1. As a result, the tiered LSM-tree degenerates to a log 308 (row 1 of FIG. 3A), which is an update-friendly data structure, while the leveled LSM-tree degenerates to a sorted array 310 (row 4 of FIG. 3A), which is a read-friendly data structure. In this way, an LSM-tree can be tuned anywhere between these two extremes 308, 310 in terms of their performance properties; this forms the characteristic of the design space.

10) Tuning Main Memory Allocation

In various embodiments, the limits 308, 310 of the curve 302 are determined by allocating main memory among the filters $M_{filters}$ and the buffer $M_{buffer}$. Thus, getting the memory allocation correct is of critical importance. Main memory today is typically composed of DRAM chips, which cost about two orders of magnitude more than a disk in terms of price per bit, and this ratio is increasing as an industry trend. Moreover, DRAM consumes about four times more power per bit than a disk during runtime. As a result, the main memory occupied by the Bloom filters and buffer accounts for a significant portion of the system's overall cost (e.g., in terms of infrastructure and operation).

11) Design Space Contentions

In various embodiments, three critical performance contentions are targeted in the LSM-tree design space. The first contention involves how a given amount of main memory $M_{filters}$ is allocated among the different Bloom filters. By reallocating main memory from the first filter to the second filter, the FPR of the first filter is reduced, but the FPR of the latter filter is increased. An approach for optimally allocating $M_{filters}$ among the different Bloom filters for minimizing the lookup cost is thus desirable. The second contention involves how to allocate the available main memory between the buffer and the Bloom filters. As indicated by the cost complexities in FIG. 3A, allocating more main memory to the buffer on one hand decreases both lookup cost and update cost, but on the other hand it decreases the Bloom filters' accuracy and thereby increases the lookup cost. Thus, it is desirable to strike the best balance. The third contention involves how to tune the size ratio and merge policy. This is challenging because workloads typically consist of different proportions of updates, zero-result lookups, non-zero-result lookups, and/or range lookups of different selectivities. While decreasing the size ratio under tiering and increasing the size ratio under leveling may improve the lookup cost and degrade the update cost, the impact and rate of change of the costs of different operation types may be different. It is thus desirable to find the best size ratio and merge policy for a particular application workload. Conventional key-value systems utilizing LSM trees differ from each other in various respects (e.g., centralized vs. decentralized architectures, different consistency guarantees, different data models, etc.), but their Bloom filters are all tuned the same, the buffer size relative to the Bloom filters size is static, and the size ratio and merge policy are also static. As a result, conventional systems provide only suboptimal decisions regarding the above contentions and are thus non-ideal.

Improved Key-Value Approach Based on LSM-Trees

Various embodiments of the present invention provide an improved key-value approach for resolving the above contentions, thereby enabling quick, accurate, and optimal navigation of the LSM-tree design space. As further described below, the improved approach can reach and navigate a Pareto curve in the LSM-tree design space so as to find the best achievable balance between the costs of lookups and updates for any given main memory budget, workload and storage medium. The improved approach maximizes throughput for uniformly random workloads as well as the lower-bound on throughput for all other workloads. In one implementation, the improved approach achieves this by resolving the contentions in the LSM-tree design space and using one or more models to optimally trade among lookup cost, update cost, and main memory footprint as further described below. It should be noted that although the improved approach is described in a key-value application herein, it may be applicable to any other applications involving LSM-trees.

Figure 4A:
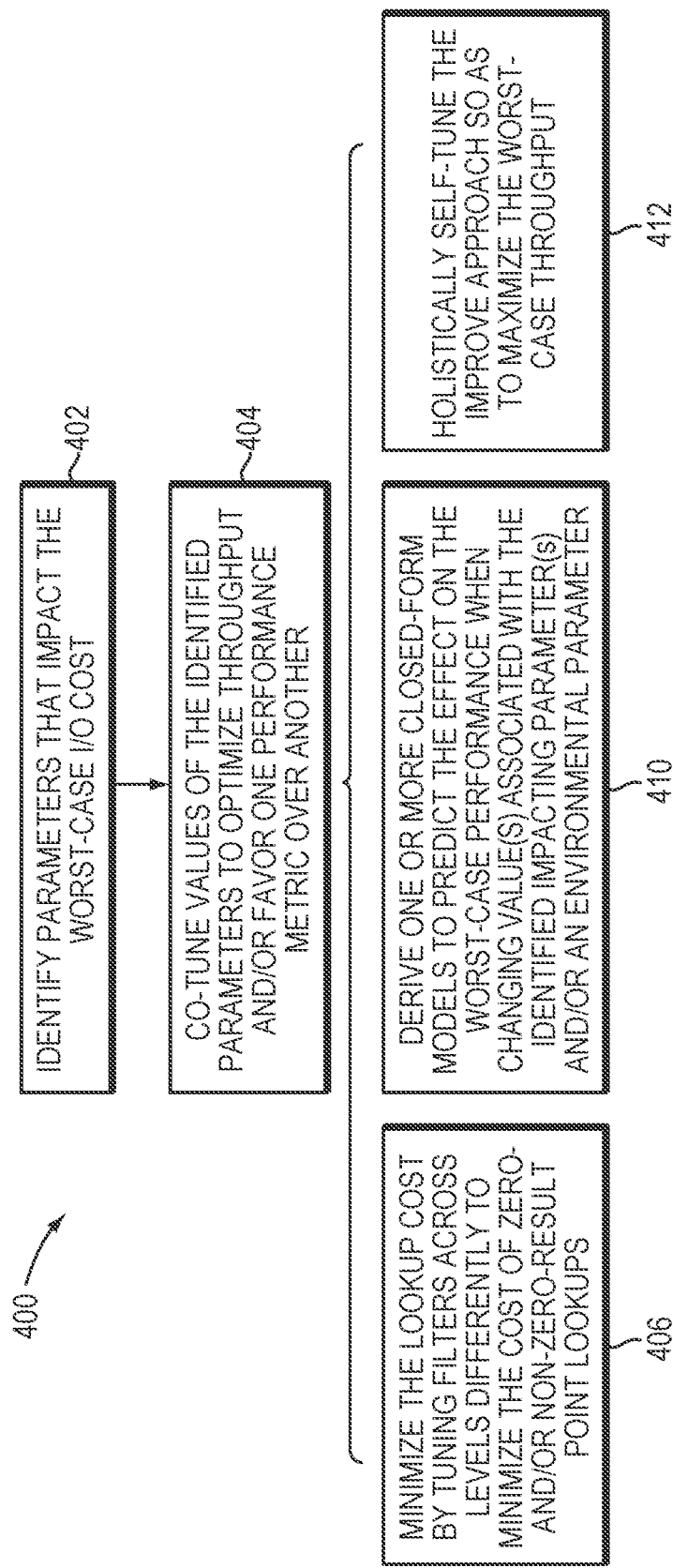
FIG. 4A is a flowchart of an exemplary improved key-value approach in accordance with various embodiments.
Figure 4D:
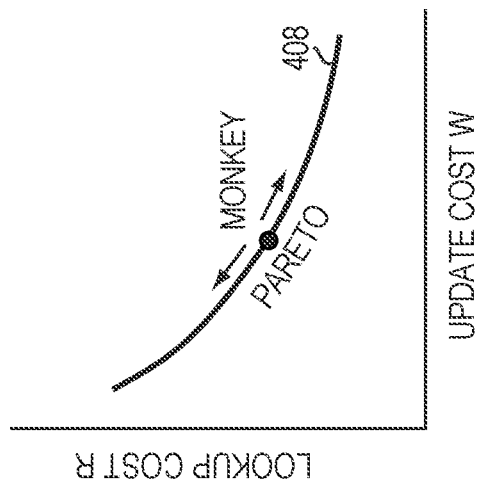
FIG. 4D illustrates a search on the Pareto curve for the balance between the lookup and update cost so as to maximize the worst-case throughput in accordance with various embodiments.
Figure 4C:
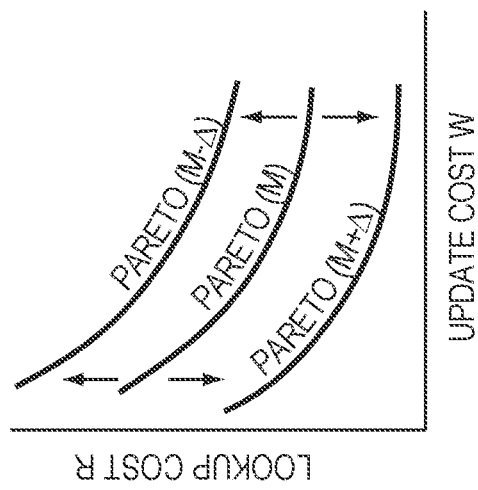
FIG. 4C illustrates a prediction of reposition of the Pareto curve when changing the environmental parameters and main memory utilization in accordance with various embodiments.
Figure 4B:
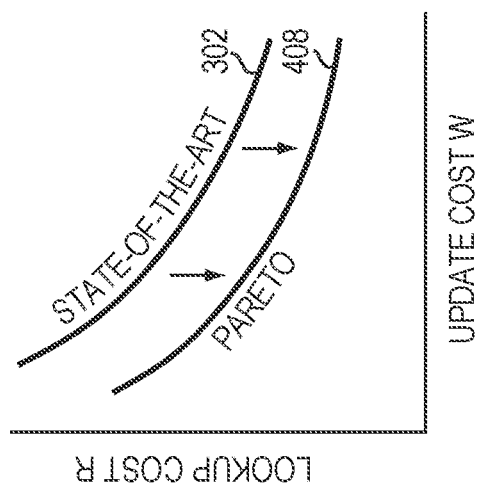
FIG. 4B illustrates that an Key-value approach may reach the Pareto curve by optimally tuning the Bloom filters in accordance with various embodiments.

Referring to FIG. 4A, in various embodiments, the improved approach 400 first identifies parameters that impact the worst-case I/O cost (in a step 402); the parameters may include, for example, the size ratio T among the levels, the merge policy (e.g., leveling vs. tiering), the FPRs (i.e., $p_1 \ldots p_L$) assigned to the Bloom filters across different levels, and/or the allocation of main memory M between the buffer $M_{buffer}$ and the filters $M_{filters}$. The improved approach may co-tune values of these parameters to optimize throughput and/or favor one performance metric over another if needed by the application in use (e.g., a bound on an average lookup or update latency) (in a step 404). The co-tuning procedure may include many steps. For example, the improved approach may tune filters across levels differently to minimize the cost of zero- and/or non-zero-result point lookups; this may optimize allocation of main memory across Bloom filters to minimize lookup cost (in a step 406). FIG. 4B depicts that by optimally tuning the Bloom filters, the improved approach may shift the entire trade-off curve 302 vertically down to the "Pareto curve" 408. In addition, the improved approach 400 may derive one or more closed-form models for the worst-case I/O costs of lookups and updates in terms of the identified parameters in the LSM-tree design space so as to predict the effect on the worst-case performance when changing the value(s) associated with the identified impacting parameter(s) and/or an environmental parameter (in a step 410 in FIG. 4A). For example, referring to FIG. 4C, the closed-form model(s) may predict repositioning of the Pareto curve by changing the overall amount of main memory or its allocation. Further, the improved approach 400 may holistically self-tune to maximize the worst-case throughput by using (i) an asymptotic analysis to map the design space, thereby devising a rule for allocating main memory between the buffer and the filters, and (ii) a prediction model estimating the worst-case throughput with respect to the closed-form model(s) for lookup cost and update cost, the proportion of lookups and updates in the workload, and the costs of reads and writes to persistent storage (in a step 412 in FIG. 4A). FIG. 4D depicts the improved approach for quickly searching the Pareto curve for the balance between the lookup and update cost so as to maximize the worst-case throughput. Further information and details of the improved approach 400 are set forth as follow.

Minimizing Lookup Cost

1) Modeling Average Worst-Case Lookup Cost

Figure 5A:
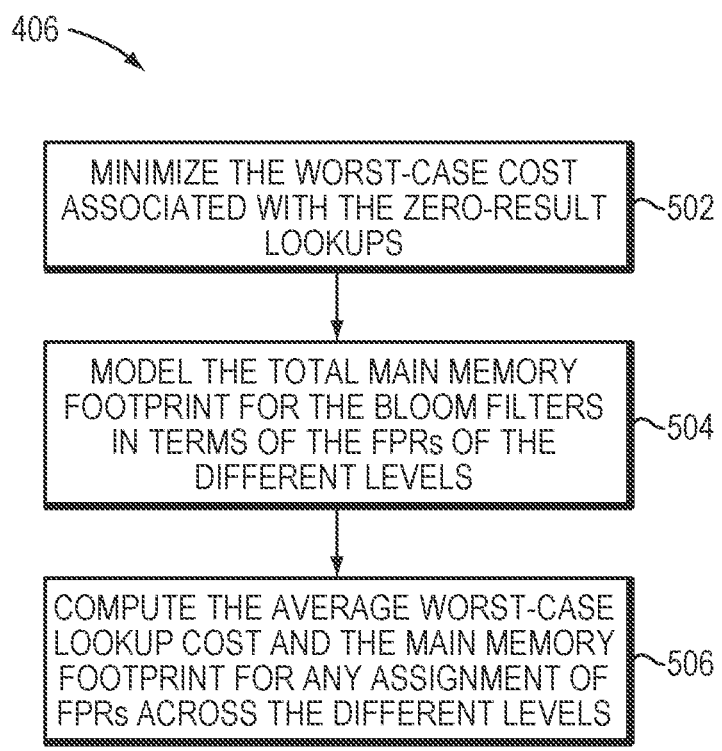
FIG. 5A is a flow chart of an approach for minimizing the lookup cost in accordance with various embodiments.

Referring to FIG. 5A, in various embodiments, to minimize the worst-case lookup cost described in step 406, the improved key-value approach 400 first minimizes the worst-case cost associated with the zero-result lookups as they incur the highest possible pure I/O overhead (i.e., I/Os that do no useful work) (in a step 502). FIG. 5B depicts a list of terms and the descriptions associated therewith used herein. In some embodiments, the improved approach 400 first models the average number (i.e., the expected value) of runs probed by a zero-result lookup to be the sum of the FPRs of all Bloom filters. With leveling, every level has at most one run; thus the worst-case expected I/O cost of a zero-result point lookup, R, is simply equal to the sum of FPRs across all levels. With tiering, there are at most T-1 runs at every level (when the $T^{th}$ run arrives from the previous level, it triggers a merge operation and a push to the next level). The FPR for all runs at the same level in tiering is the same because they have the same size. Eq. (3) expresses this sum in terms of the FPRs, $p_1 \ldots p_L$, assigned to filters at different levels for the two merge policies.

$$R = \begin{cases} \sum_{i=1}^{L} p_i, & \text{with leveling} \\ (T-1) \cdot \sum_{i=1}^{L} p_i, & \text{with tiering} \end{cases} \quad \text{Eq. (3)}$$

where $0 < p_i \leq 1$.

2) Modeling Main Memory Footprint

The improved approach 400 may then model the total main memory footprint for the Bloom filters in terms of the FPRs, $p_1 \ldots p_L$, of the different levels (in a step 504). To do so, Eq. (2) is first rearranged in terms of the number of bits in a filter:

$$\text{bits} = -\text{entries} \cdot \frac{\ln(FPR)}{\ln(2)^2}.$$

This equation captures the cumulative size of any number of the Bloom filters that have the same FPRs, and can thus be applied out-of-the-box for both leveling (having one Bloom filter per level) and tiering (having T-1 Bloom filters per level) by identifying and plugging in the number of entries and the FPR for each level. Referring again to FIG. 1, the last level of the LSM tree has at most $$N \cdot \frac{T-1}{T}$$

entries, and in general Level i has at most $$\frac{N}{T^{L-i}} \cdot \frac{T-1}{T}$$

entries (as smaller levels have exponentially smaller capacities by a factor of T). Thus, the amount of main memory occupied by the Bloom filters at Level i is at most $$-\frac{N}{T^{L-i}} \cdot \frac{T-1}{T} \cdot \frac{\ln(p_i)}{\ln(2)^2}$$

bits, and the overall amount of main memory allocated cumulatively to all Bloom filters is the sum thereof over all levels, satisfying:

$$M_{filters} = -\frac{N}{\ln(2)^2} \cdot \frac{T-1}{T} \cdot \sum_{i=1}^{L} \frac{\ln(p_i)}{T^{L-i}}. \quad \text{Eq. (4)}$$

3) Minimizing Lookup Cost with the Improved Approach

Using Eqs. (3) and (4), the average worst-case lookup cost, R, and the main memory footprint $M_{filters}$ for any assignment of FPRs across the different levels can then be computed (in a step 506). To minimize R with respect to $M_{filters}$, the improved approach first finds the optimal assignment of FPRs, $p_1 \ldots p_L$, across the different levels that minimizes $M_{filters}$ for any user-specified value of R. This amounts to a multivariate constrained optimization problem, and can be solved by applying the method of Lagrange Multipliers on Eqs. (3) and (4). Eqs. (5) and (6) are the computed optimal assignments of FPRs across different levels for the leveling and tiering merge policies, respectively.

Leveling  Eq. (5)

$$p_i = \begin{cases} 1, & \text{if } i > L_{filtered} \\ \frac{(R - L_{unfiltered}) \cdot (T-1)}{T^{L_{filtered}+1-i}}, & \text{else} \end{cases}$$

for $0 < R \leq L$
and $1 \leq i \leq L$
and $L_{filtered} = L - \max(0, \lfloor R-1 \rfloor)$ Tiering  Eq. (6)

$$p_i = \begin{cases} 1, & \text{if } i > L_{filtered} \\ \frac{(R - L_{unfiltered}) \cdot (T-1)}{T^{L_{filtered}+1-i}}, & \text{else} \end{cases}$$

for $0 < R \leq L(T-1)$
and $1 \leq i \leq L$
and $L_{filtered} = L - \max\left(0, \left\lfloor \frac{R-1}{T-1} \right\rfloor\right)$ FIG. 5C illustrates how the improved approach optimally assigns FPRs to Bloom filters across different levels using Eqs. (5) and (6). In general, the optimal FPR at Level i is T times higher than the optimal FPR at Level i-1. In other words, the optimal FPR for level i is proportional to the number of elements at level i. This indicates that the I/O cost of probing any run is the same regardless of its size (only the qualifying disk page is fetched due to the fence pointers), yet the amount of main memory needed for achieving a low FPR at the deeper levels is significantly higher since they have exponentially more entries. Accordingly, setting relatively more bits per entry (i.e., a lower FPR) to the filters at smaller levels may effectively and optimally minimize the lookup cost. In contrast, conventional LSM-tree-based key-value systems assign the same FPR to Bloom filters across all the different levels.

In addition, the higher the lookup cost R is set, the less main memory for the Bloom filters may be needed. As depicted in FIG. 5C, for higher values of R, more of the Bloom filters at the deepest levels cease to exist, as their optimal FPRs converge to 1. Note that the number of levels with and without the Bloom filters are denoted as $L_{filtered}$ and $L_{unfiltered}$, respectively; $L = L_{filtered} + L_{unfiltered}$. In some embodiments, Eqs. (5) and (6) are adapted to find the optimal division between $L_{filtered}$ and $L_{unfiltered}$ and to prescribe FPRs to the shallowest $L_{filtered}$ levels based on a smaller version of the problem with $L_{filtered}$ levels.

Figure 5D:
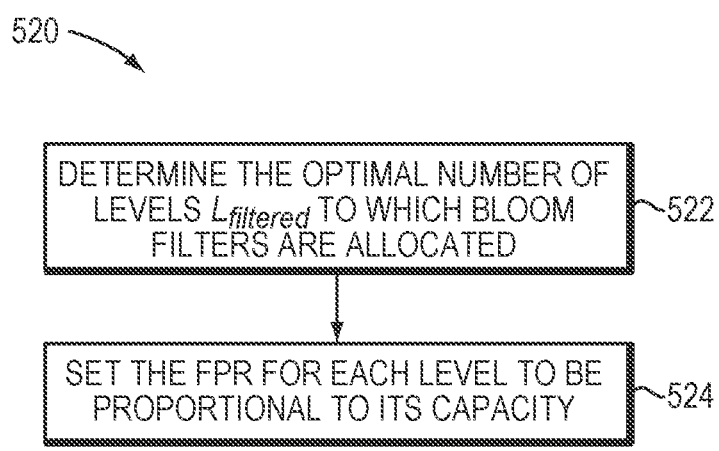
FIG. 5D is a flow chart of an exemplary approach for minimizing the main memory footprint for the Bloom filters for a given lookup cost in accordance with various embodiments.

FIG. 5D depicts an exemplary approach 520 for minimizing the main memory footprint for the Bloom filters for a given lookup cost R. In various embodiments, the approach 520 includes determining the optimal number of levels $L_{filtered}$ to which Bloom filters are allocated (in a first step 522), and setting the FPR for each of these levels to be proportional to its capacity (in a second step 524). Through steps 522, 524, the improved approach 400 may achieve the performance effect as shown in FIG. 4B.

4) Predicting Lookup and Update Costs

Figure 6A:
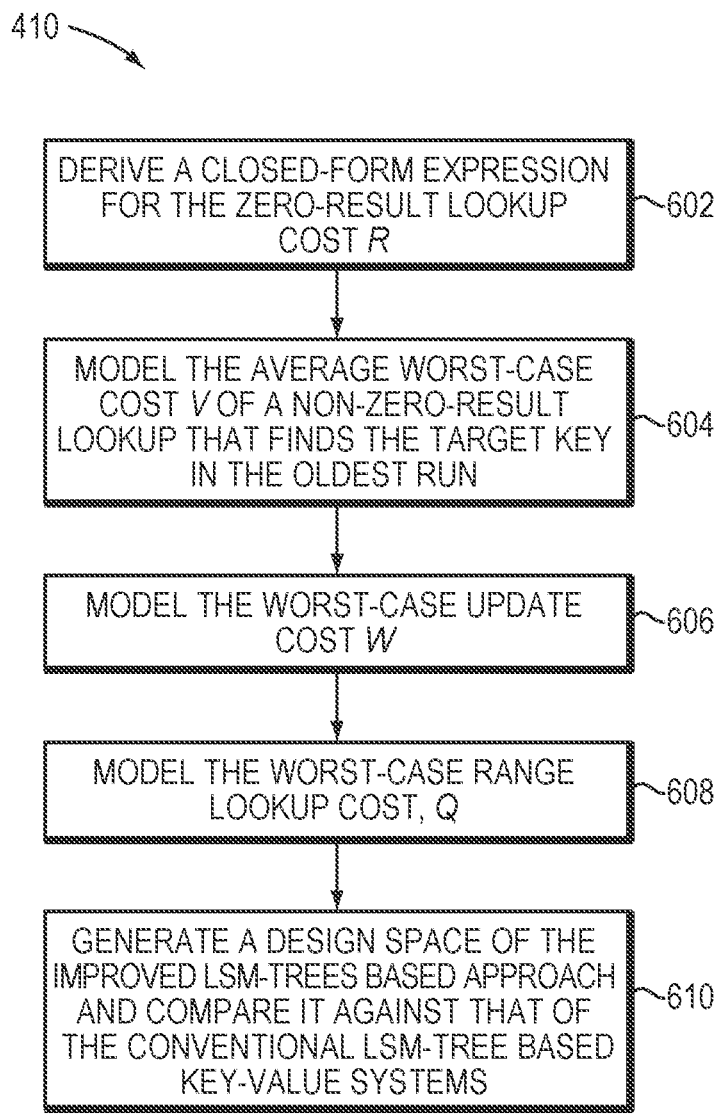
FIG. 6A is a flow chart of an approach for predicting the impact of various parameters on the worst-case I/O cost in accordance with various embodiments.

FIG. 6A is a flow chart of an approach for accurately predicting the impact of the parameters (identified in step 402) and/or an environmental parameter corresponding to the worst-case I/O cost described in step 410. In various embodiments, a design space of the improved LSM-trees based approach is first generated by modeling the lookup and update costs in closed-form expressions with respect to all (or at least some of) the identified parameters and/or the environmental parameter in the improved LSM-tree design space as further described below.

5) Modeling Zero-Result Lookup Cost, R

In some embodiments, the optimal FPRs in Eqs. (5) and (6) are plugged into Eq. (4) to derive a closed-form expression for the zero-result lookup cost R (step 602); Eq. (7) is the resulting simplified and rearranged expression, assuming a fixed entry size:

$$R = R_{filtered} + R_{unfiltered} \qquad \text{Eq. (7)}$$

$$R_{filtered} = \begin{cases} \dfrac{T^{\frac{T}{T-1}}}{T-1} \cdot e^{-\frac{M_{filters}}{N}} \cdot \ln(2)^2 \cdot T^{L_{unfiltered}} & \text{with leveling} \\ \dfrac{T^{\frac{T}{T-1}}}{T-1} \cdot e^{-\frac{M_{filters}}{N}} \cdot \ln(2)^2 \cdot T^{L_{unfiltered}} & \text{with tiering} \end{cases}$$

$$R_{unfiltered} = \begin{cases} L_{unfiltered}, & \text{with leveling} \\ L_{unfiltered} \cdot (T-1), & \text{with tiering} \end{cases}$$

The additive terms, $R_{filtered}$ and $R_{unfiltered}$, correspond to the average number of runs probed in the levels with and without the Bloom filters, respectively. In addition, when the size ratio T is set to 2, tiering and leveling behave identically; thus, the two versions of the equations for tiering and leveling produce the same result.

To compute the number of deeper levels for which there are no filters, a threshold value $M_{threshold}$ of main memory at which the FPR of the filters at the last level (i.e., Level L) converging to 1 may be first determined:

$$M_{threshold} = \frac{N}{\ln(2)^2} \cdot \frac{\ln(T)}{(T-1)}$$

The optimal value of $L_{unfiltered}$ can then be computed based on $M_{threshold}$:

$$L_{unfiltered} = \qquad \text{Eq. (8)}$$

$$\begin{cases} 0, & M_{threshold} \leq M_{filters} \\ \left\lceil \log_T\left(\dfrac{M_{threshold}}{M_{filters}}\right)\right\rceil, & \dfrac{M_{threshold}}{T^L} \leq M_{filters} \leq M_{threshold} \\ L, & 0 \leq M_{filters} \leq \dfrac{M_{threshold}}{T^L} \end{cases}$$

Subsequently, the optimal value of $L_{unfiltered}$ given in Eq. (8) may be plugged into Eq. (7) to compute the zero-result lookup cost R.

6) Modeling Worst-Case Non-Zero-Result Lookup Cost, V

Using Eq. (7) for the average worst-case zero-result lookup cost R, the average worst-case cost V of a non-zero-result lookup that finds the target key in the oldest run may then be modeled (step 604). In various embodiments, $p_L$ (which is the FPR of the oldest run's filter) can be subtracted from the average worst-case zero-result lookup cost R and then 1 can be added to account for reading one page of this run. As a result, V is given as:

$$V = R - p_L + 1 \qquad \text{Eq. (9).}$$

7) Modeling Worst-Case Update Cost, W

To model the worst-case update cost (step 606), a worst-case update pattern is assumed, where an entry is updated at most once within a period of N application writes. Thus, there is no entry eliminated before being merged into the largest level. Using an arithmetic series, the amortized worst-case numbers of merge operations that an entry participates in per level for tiering and leveling are modeled as $$\approx \frac{T-1}{T} \text{ and } \approx \frac{T-1}{2},$$

respectively. Because each entry moves through L levels and each write I/O moves B entries from the original runs to the resulting run, the amortized worst-case numbers of merge operations are then multiplied by L and divided by B. In addition, to account for reading the original runs in order to merge them, and because write I/Os to secondary storage on some storage devices (e.g., flash) are more expensive than reads, the amortized worst-case numbers of merge operations may be multiplied by $(1+\varphi)$, where $\varphi$ is the cost ratio between writes and reads. As a result, the overall I/O cost is given as:

$$W = \begin{cases} \dfrac{L}{B} \cdot \dfrac{T-1}{2} \cdot (1 + \emptyset), & \text{with leveling} \\ \dfrac{L}{B} \cdot \dfrac{T-1}{T} \cdot (1 + \emptyset), & \text{with leveling} \end{cases} \qquad \text{Eq. (10)}$$

When T is set to 2, the two parts of Eq. (10) produce the same result; thus, tiering and leveling behave identically as predicted above.

8) Modeling Worst-Case Range Lookup Cost, Q

A range lookup may involve doing L or L·(T−1) disk seeks (one per run) for leveling and tiering, respectively; each seek may then be followed by a sequential scan. The cumulative number of pages scanned over all runs is computed as $$s \cdot \frac{N}{B},$$

where s represents me average proportion of all entries included in range lookups. Thus, the overall range lookup cost Q in terms of pages reads may be given as (step 608):

$$Q = \begin{cases} s \cdot \frac{N}{B} + L, & \text{with leveling} \\ s \cdot \frac{N}{B} + L \cdot (T-1), & \text{with leveling} \end{cases} \quad \text{Eq. (11)}$$

Modeling the Conventional and Improved Key-Value Approaches

An analogous model may then be derived for conventional key-value systems. The models for V, W, and Q as described in Eqs. (9), (10) and (11) are the same as those for the improved approach (because the improved approach does not alter these operations). In some embodiments, to model the worst-case expected point lookup I/O cost, $R_{conventional}$, all FPRs (i.e., $p_1, p_2 \ldots p_L$) in Eq (3) are set to be equal to each other. The resulting closed-form expression is given as:

$$R_{conventional} = \begin{cases} L \cdot e^{-\frac{M_{filters}}{N} \cdot \ln(2)^2}, & \text{with leveling} \\ L \cdot (T-1) \cdot e^{-\frac{M_{filters}}{N} \cdot \ln(2)^2}, & \text{with tiering} \end{cases} \quad \text{Eq. (12)}$$

Figure 6B:
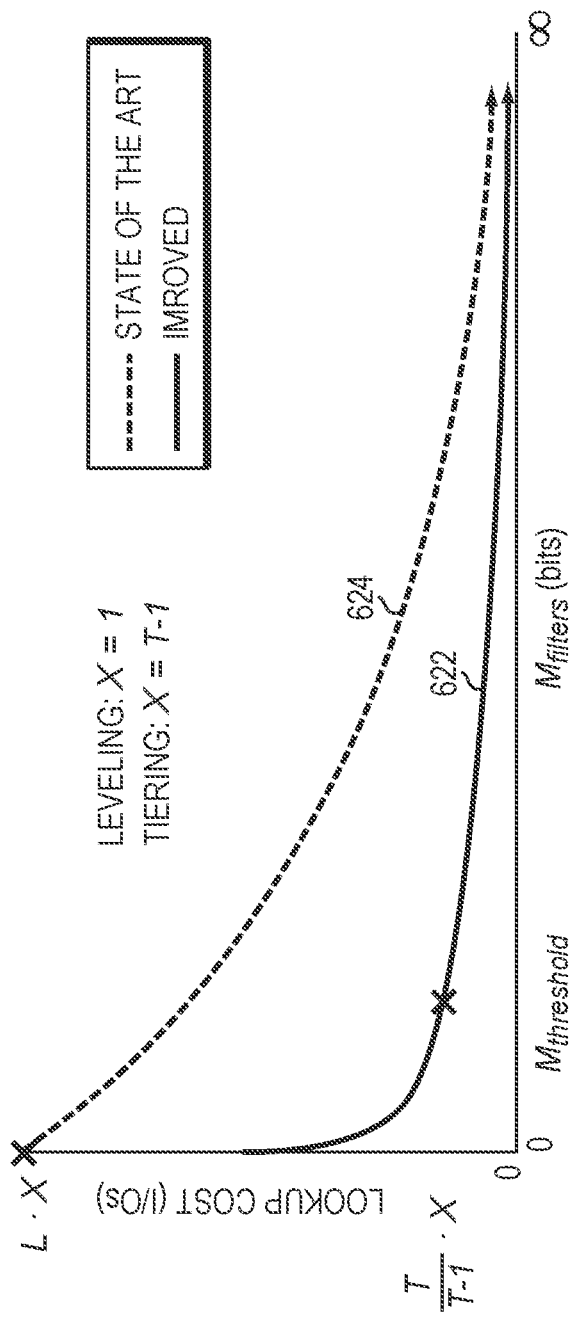
FIG. 6B illustrates the performance comparison of the improved approach and conventional systems.

The lookup cost model in conventional systems may then be compared against the two lookup cost models in the improved approach (i.e., Eqs. (7) and (8)) (step 610). FIG. 6B illustrates the comparison of the improved approach and conventional systems by plotting the zero-result lookup cost as a function of $M_{filters}$ in accordance with Eqs. (7), (8) and (12) (while the terms are general, the curves in FIG. 6B are drawn for an LSM-tree with 512 TB of data and having the number of entries N=235, the entry size E=16 bytes, the size ratio T=4, the buffer size B·P·E=2 MB, and $M_{filters}$ varying from 0 to 35 GB. As shown, the improved approach (curve 622) dominates conventional systems (curve 624) in terms of the lookup cost for any amount of main memory allocated to the filters. This is because the improved approach allocates the memory optimally among the Bloom filters to minimize the average number of read I/Os per lookup. In addition, as $M_{filters}$ approaches 0, the curve 622 of the improved approach and the curve 624 of conventional systems both degenerate into an LSM-tree having no Bloom filters and therefore become similar or the same. The term "X" in the figure is used to adjust the terms for leveling and tiering; the two curves thereof look identical except that the curve for tiering is vertically stretched upwards by a factor of (T−1) since there are T−1 more runs per level.

Scalability and Tunability

1) Complexity Analysis

In one embodiment, an asymptotic analysis is applied to continuously explore and map the design space for the improved approach. FIG. 7 depicts the worst-case lookup cost and update cost for various models by applying the standard simplification rules on Eqs. (7) and (8) for R in the improved approach, on Eq. (12) for the lookup cost in conventional systems, and on Eq. (10) for the update cost in both improved and conventional approaches. As shown, the complexity of the worst-case case lookup cost for the improved approach varies, depending on whether $M_{filters}$ is greater or lower than $M_{threshold}$. This is because R in Eq. (7) is expressed as the sum of two additive terms, $R_{filtered}$ and $R_{unfiltered}$. As long as $M_{filters} > M_{threshold}$, there are filters at all levels, and so $R_{unfiltered}$ is zero and $R_{filtered}$ is the dominant term. Moreover, by plugging in $M_{threshold}$ for $M_{filters}$ in Eq. (7), the value of $R_{filtered}$ can be at most O(1) for leveling and at most O(T) for tiering. However, as the number of entries N increases relative to $M_{filters}$, eventually $M_{filters}$ drops below $M_{threshold}$; at this point $R_{filtered}$ becomes non-zero and proceeds to dominate $R_{filtered}$ because its value is at least O(1) with leveling and O(T) with tiering when $M_{filters} = M_{threshold}$, and it increases up to O(L) with leveling and O(L·T) with tiering as N increases. Thus, when $M_{filters} > M_{threshold}$, the complexity of the worst-case lookup cost R is O($R_{filtered}$), and otherwise, it is O($R_{unfiltered}$).

In addition, the condition that $M_{filters}$ is larger than $M_{threshold}$ can be equivalently stated as having the number of bits per element, $$\frac{M_{filters}}{N},$$

larger than $$\frac{1}{\ln(2)^2} \cdot \frac{\ln(T)}{T-1}.$$

The value of $$\frac{1}{\ln(2)^2} \cdot \frac{\ln(T)}{T-1}$$

is at most 1.44 when T is equal to 2. Thus, the complexity of worst-case lookup cost R is O($R_{filtered}$) when the number of bits-per-element is above 1.44, and otherwise it is O($R_{unfiltered}$). In modern key-value systems, the number of bits-per-element is typically 10, far above 1.44, and so for most practical purposes, the complexity of the improved approach described herein is O($R_{filtered}$).

The complexity of the lookup cost for conventional approaches may also be expressed separately depending on whether $M_{filters}$ is lower or larger than $M_{threshold}$ (column b and c, respectively, in FIG. 7). As depicted, when $M_{filters}$ is lower than $M_{threshold}$, the complexity of the lookup cost converges to that of an LSM-tree having no filters.

2) Comparing the Improved Approach to Conventional Systems

When $M_{filters} > M_{threshold}$ (depicted in columns c and e in FIG. 7), the improved approach shaves a factor of O(L) from the complexity of the lookup cost for both tiering and leveling (depicted in rows 2 and 3 in FIG. 7). (Note that O(L) in FIG. 7 is expressed as $$O\left(\log_T\left(\frac{N \cdot E}{M_{buffer}}\right)\right)$$

based on Eq. (1).) In other words, the lookup cost R in the improved approach is asymptotically independent of the number of levels L of the LSM-tree. This indicates that the FPRs for smaller levels are exponentially decreasing, and thus the expected cost of probing the filters across the levels converges to a multiplicative constant. Shaving a factor of O(L) from the lookup cost may have at least three important benefits compared to conventional systems. First, as long as the Bloom filters' footprint is scaled with the number of data entries (i.e., keep the ratio $$\frac{M_{filters}}{N}$$

fixed as N increases), the lookup cost in the improved approach stays fixed; whereas in conventional systems, the lookup cost increases at a logarithmic rate. In this way, the improved approach 400 dominates conventional systems by an increasingly large margin as the number of entries increases. Second, the lookup cost in the improved approach is independent of the entry size; accordingly, the lookup cost does not increase for data sets with larger entry sizes. Finally, the lookup cost in the improved approach is independent of the buffer size. This simplifies tuning relative to conventional systems, because the need to carefully balance main memory allocation between the buffer and filters for optimizing the lookup performance is obviated in the improved approach.

When $M_{filters} > M_{threshold}$, the lookup cost in conventional systems (column b, rows 2 and 3 in FIG. 7) decreases at a logarithmic rate as $M_{buffer}$ increases, because it absorbs more of the smaller levels. In contrast, the lookup cost in the improved approach decreases at a logarithmic rate as $M_{filters}$ increases (column d, rows 2 and 3), since more of the deeper levels have the Bloom filters. Accordingly, compared with conventional systems, the improved approach 400 shaves an additive factor of $O(\log_T (E))$ (where E is the entry size) from the lookup cost. The reason is that the Bloom filters are only sensitive to the number of entries rather than their sizes; this indicates that the lookup cost in the improved approach does not increase for data sets with larger entries. Accordingly, the improved approach dominates conventional systems for all data sets and tunings (because the improved approach allocates main memory optimally among the Bloom filters thereby minimizing the lookup cost).

Figure 8:
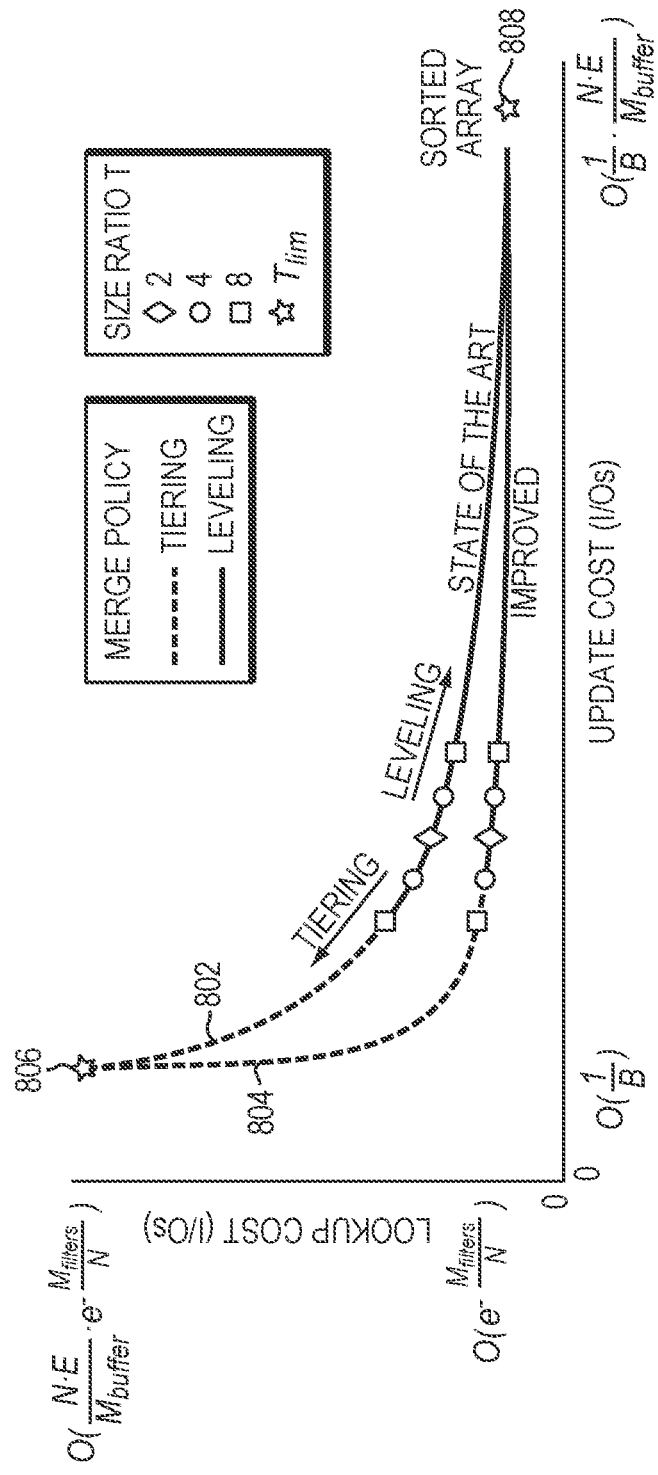
FIG. 8 depicts the design space of LSM-trees with respect to the impact on the lookup and update costs in accordance with various embodiments.

Referring to FIG. 8, the design space of LSM-trees with respect to the impact on the lookup and update costs for conventional systems (curve 802) and the improved approach (curve 804) may be explored to determine the behavior of the lookup cost with respect to the size ratio, T, (shown in rows 1 and 4 of FIG. 7). As the size ratio T approaches its limit value $T_{lim}$ for both leveling and tiering, the number of levels L approaches 1. When $T=T_{lim}$, the improved approach and conventional systems both degenerate into a log 806 and a sorted array 808 with tiering and leveling, respectively, and thus their performance characteristics converge. For all other values of the size ratio T in-between, the improved approach 804 dominates conventional systems 802 by reducing the lookup cost, hence reaching the Pareto curve.

Figure 9A:
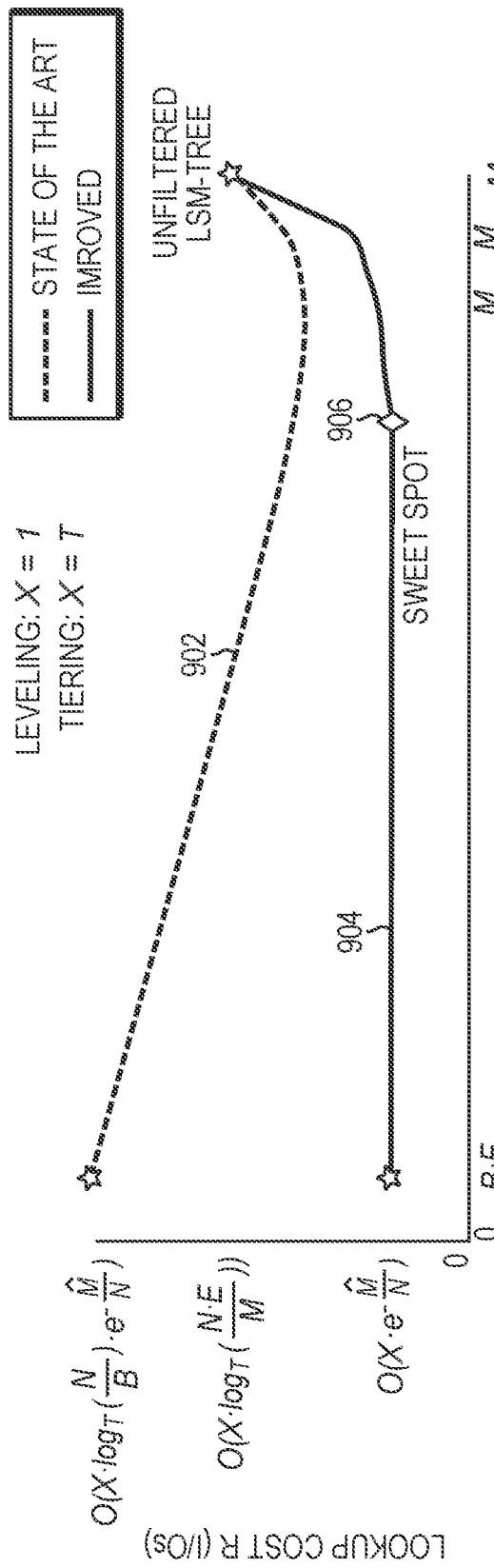
FIG. 9A depicts a relationship between the lookup cost and the relative sizes of the buffer and the Bloom filters in accordance with various embodiments.
Figure 9B:
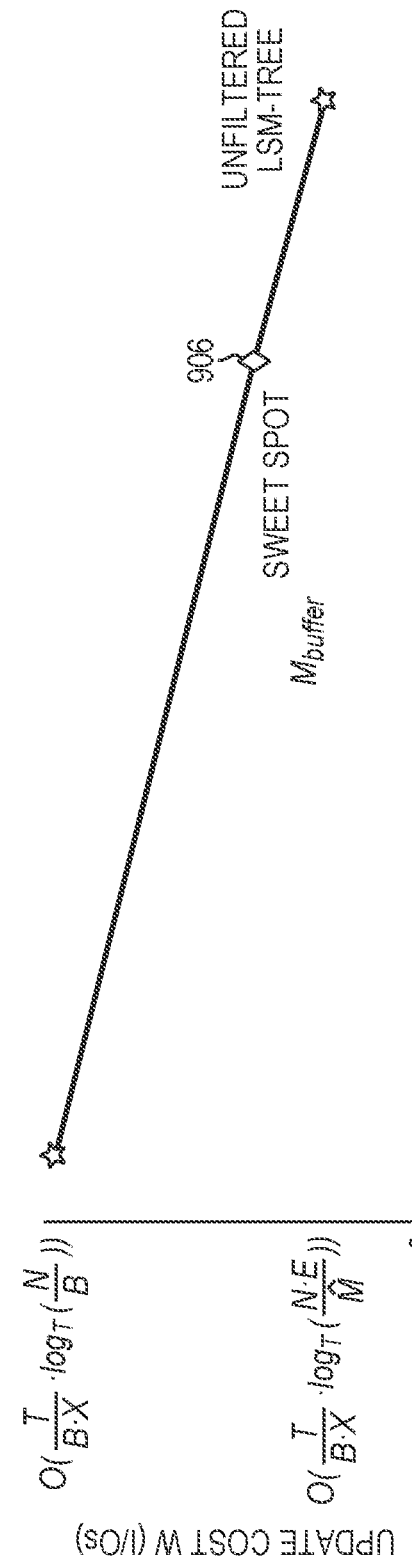
FIG. 9B depicts a relationship between the update cost and the relative sizes of the buffer and the Bloom filters in accordance with various embodiments.

FIG. 9A depicts the relationship between the lookup cost and the relative sizes of the buffer and the filters in the improved approach and conventional systems; FIG. 9B depicts the relationship between the update cost and the relative sizes of the buffer and the filters in the improved approach. It should be noted that although the curves in FIGS. 9A and 9B are drawn using the models described above, the terms and behaviors are general. In various embodiments, the amount of main memory excluding the fence pointers that is to be divided between the fence pointers and buffer is defined as $\hat{M}$ bits, $\hat{M}=M_{buffer}+M_{filters}$. On the x-axis (which is a log scale) of FIGS. 9A and 9B, $M_{buffer}$ is increased at the expense of $M_{filters}$ from one disk page (B·E bits) to $\hat{M}$ bits; in this case, the Bloom filters cease to exist (i.e., $M_{filters}=0$). The term "X" is used to adjust the y-axis for leveling and tiering. FIG. 9A illustrates that the Bloom filters in conventional systems (curve 902) actually harm the lookup performance for a significant portion of the space because the main memory that they occupy is better off allocated to the buffer. The improved approach 400 described herein advantageously removes this performance contention (curve 904), thereby simplifying system tuning by making lookup cost independent of the buffer size, provided that $$M_{filters} > \frac{M_{threshold}}{T^L}$$

as per Eq. (8). As the buffer continues to grow, however, the Bloom filters shrink and eventually cease to exist; at which point the curves for the improved approach and conventional systems converge. FIG. 9B illustrates that increasing the buffer size decreases the update cost but incurs diminishing returns as the update cost decreases at a logarithmic rate. Thus, it is desirable to set the buffer size as large as possible to reduce the update cost while still keeping the buffer size below the point where it begins to significantly harm lookup cost; this desired buffer size is marked as a "sweet spot" 906 in FIGS. 9A and 9B. FIGS. 9A and 9B, as further described below, may be utilized to allocate main memory among the filters and buffer.

Optimizing for Non-Zero-Result Point Lookups

Using the improved approach 400, a non-zero-result point lookup with leveling either terminates before reaching the largest level, or in the worst-case, finds the target key at the largest level. As a result, a Bloom filter at the largest level is redundant as it always returns a true positive when probed. Similarly with tiering, a non-zero-result point lookup probes on average half of the runs at the largest level before finding the target entry and terminating. Therefore, half of the Bloom filters at the largest level on average do not yield a performance benefit. In one embodiment, the capacity and optimal FPRs of the amount of memory $M_i$ taken up by the Bloom filters at Level i computed in Eqs. (5) and (6) are plugged into Eq. (2). Consequently, $M_i$ is determined to be $$O\left(\frac{M_{filters}}{T^{L-1}}\right);$$

this indicates that the Bloom filters at larger levels take up exponentially more memory because they contain more entries.

Based on this analysis, the improved approach 400 may allocate most of the main memory budget to the largest level to optimize for zero-result point lookups, yet most of this main memory may not significantly benefit non-zero-result point lookups. To optimize for non-zero-result point lookups, it may be more beneficial to allocate a higher proportion of the memory budget to filters at smaller levels to reduce the number of false positives that take place before finding the target key. In various embodiments, an improved hybrid approach may be utilized as further described below to allocate a higher proportion of the memory budget to smaller levels as the proportion of the non-zero-result point lookups in the workload increases.

Modeling Generalized Point Lookups

Figure 10A:
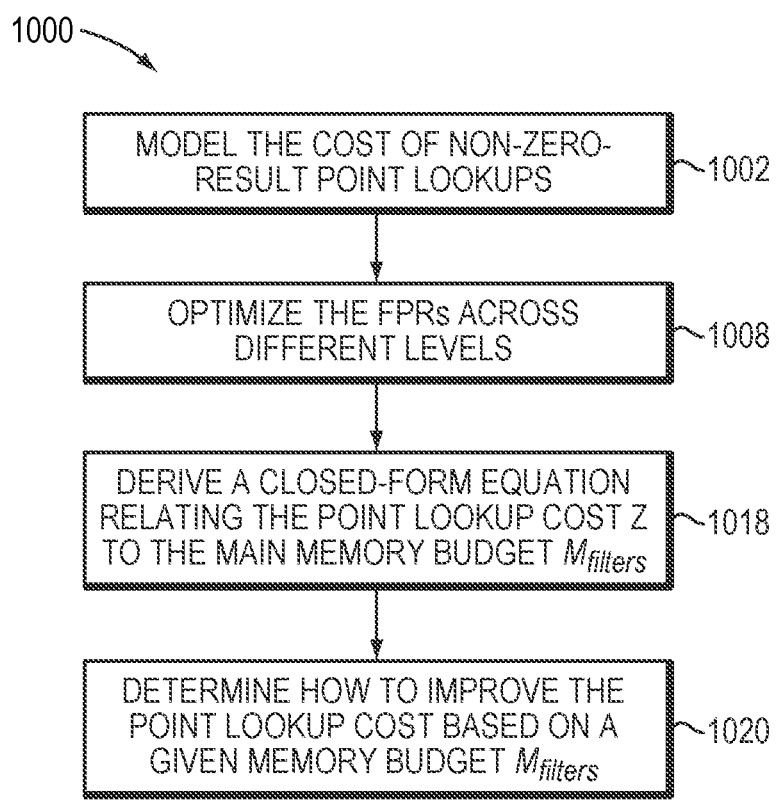
FIGS. 10A-10C are flow charts of an improved hybrid approach for allocating the memory budget to different levels in accordance with various embodiments.

Referring to FIG. 10A, in various embodiments, the improved hybrid approach 1000 first models the cost of non-zero-result point lookups (in a first step 1002). With leveling, because a lookup issues one I/O to the largest level, and it incurs $R-p_L$ expected I/Os due to the false positives at smaller levels, the expected cost is $1+R-p_L$ (where R is the sum of the FPRs from Eq. (7)). With tiering, because a lookup probes on average half of the runs at the largest level before finding the target key, the expected cost is $$1 + R - \frac{p_L \cdot T}{2} \text{ I/Os}.$$

Figure 10B:
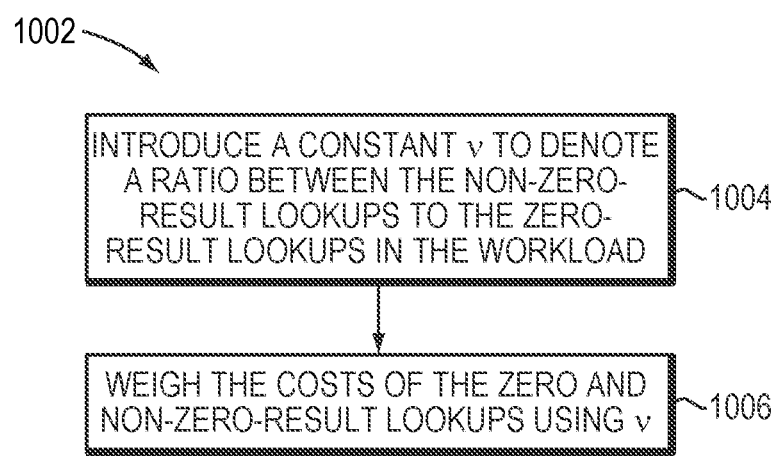

Referring to FIG. 10B, the step 1002 may include a step 1004 that introduces a constant v to denote the ratio between the non-zero-result lookups to the zero-result lookups in the workload. In a step 1006, the costs of zero and non-zero-result lookups are weighed using v in Eq. (13), where Z represents the expected I/O cost of a lookup.

$$Z = \begin{cases} \frac{v}{v+1} \cdot (1 + R - p_L) + \frac{1}{v+1} \cdot R, & \text{with leveling} \\ \frac{v}{v+1} \cdot \left(1 + R - \frac{p_L \cdot T}{2}\right) + \frac{1}{v+1} \cdot R, & \text{with tiering} \end{cases} \quad \text{Eq. (13)}$$

Optimizing FPRs

Figure 10C:
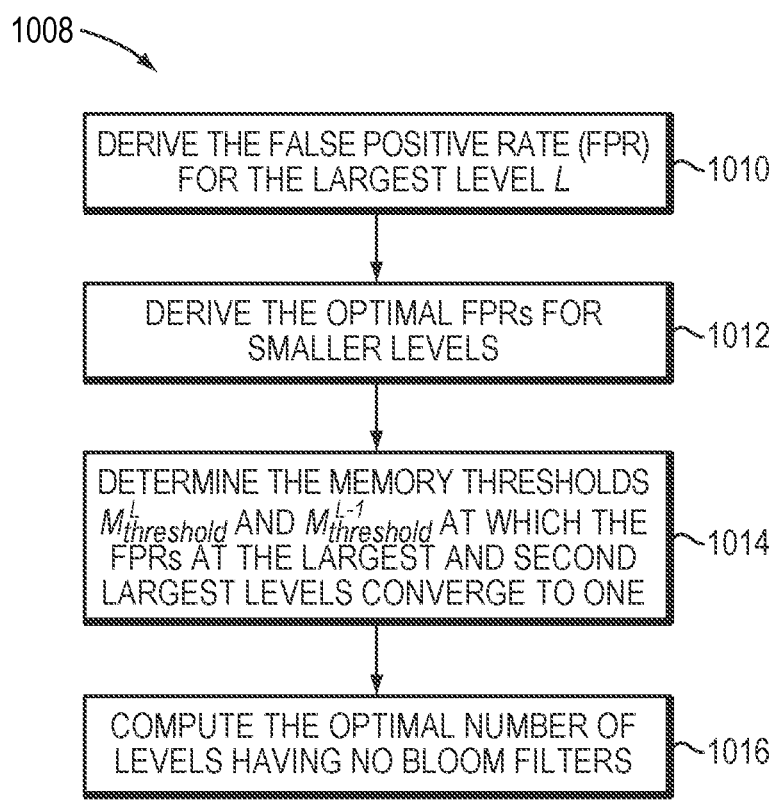

Referring again to FIG. 10A, the improved hybrid approach 1000 may then optimize the FPRs across the different levels in Eq. (13) using Eq. (4) as a constraint (in a step 1008). As utilized in minimizing the lookup cost above, the method of Lagrange Multipliers may also be applied here. Referring to FIG. 10C, the improved hybrid approach may derive $p_L$, the FPR for the largest level (in a step 1010). The results are expressed in Eqs. (14) and (15) for leveling and tiering, respectively. As indicated, when the proportion of the non-zero-result point lookups v increases, the optimal value for $p_L$ increases with both leveling and tiering as it becomes less beneficial to allocate memory to the filter at the largest level. In addition, when v is set to zero, Eqs. (14) and (15) converge to Eqs. (5) and (6), respectively, as there is only need of optimization for the zero-result point lookups in this case.

Leveling $$p_L = \begin{cases} (Z \cdot (v+1) - v) \cdot \frac{(T-1)}{T}, & L_{unfiltered} = 0 \\ 1, & \text{otherwise} \end{cases} \quad \text{Eq. (14)}$$

Tiering $$p_L = \begin{cases} \frac{Z \cdot (v+1) - v}{T \cdot (v+1)} \cdot \left(1 - \frac{v \cdot T}{2 \cdot (v+1) \cdot (T-1)}\right)^{-1}, & L_{unfiltered} = 0 \\ 1, & \text{otherwise} \end{cases} \quad \text{Eq. (15)}$$

In a subsequent step 1012, the optimal FPRs are derived for smaller levels (i.e., the level number i below a predetermined threshold). Again, the method of Lagrange Multipliers may be applied here. The results are expressed in Eqs. (16) and (17) for leveling and tiering, respectively; each of these equations has three cases. The first case is for when memory is plentiful enough to have the Bloom filters across all levels (i.e., $L_{unfiltered}=0$). In this case, the FPRs at smaller levels decrease when v increases, as it becomes more beneficial to invest more of the memory budget in smaller levels. The other two cases are for when there is insufficient memory for having the Bloom filters at the largest level.

Both zero and non-zero-result point lookups issue I/Os to the largest level and need to minimize the sum of FPRs at the smaller levels with the filters. As a result, the optimal memory allocation among the filters becomes the same as that in Eqs. (5) and (6) (though Eqs. (16) and (17) are expressed in terms of Z rather than R).

Leveling $$p_{L-i} = \begin{cases} \left(Z - \frac{v}{v+1}\right) \cdot \frac{T-1}{T} \cdot \frac{1}{T^i}, & L_{unfiltered} = 0 \\ \frac{(Z - L_{unfiltered})}{T^{i-L_{unfiltered}}} \cdot \frac{T-1}{T}, & 0 < L_{unfiltered} \le i \\ 1 & L_{unfiltered} > i \end{cases} \quad \text{Eq. (16)}$$

Tiering $$p_{L-i} = \begin{cases} \frac{1}{T^i} \cdot \frac{Z \cdot (v+1) - v}{T \cdot (v+1)}, & L_{unfiltered} = 0 \\ \frac{\left(Z - \lceil \frac{T}{2} \rceil - (L_{unfiltered} - 1) \cdot (T-1)\right)}{T^{1+i-L_{unfiltered}}}, & 0 < L_{unfiltered} \le i \\ 1 & L_{unfiltered} > i \end{cases} \quad \text{Eq. (17)}$$

In step 1014, the improved hybrid approach may determine the memory thresholds $M_{threshold}^L$ and $M_{threshold}^{L-1}$ at which the FPRs at the largest and second largest levels converge to one. In one embodiment, the thresholds $M_{threshold}^L$ and $M_{threshold}^{L-1}$ are derived by plugging the optimal FPRs from Eqs. (14)-(17) into Eq. (4), rearranging in terms of Z, and equating to Z in Eqs. (14)-(17) when $p_L$, and $p_{L-1}$ are set to 1. Using these thresholds, the optimal number of levels with no filters can be computed using Eq. (18) (step 1016).

$$L_{unfiltered} = \begin{cases} 0, & M_{threshold}^L \le M_{filters} \\ 1, & M_{threshold}^{L-1} \le M_{filters} \le M_{threshold}^{L-1} \\ 1 + \lceil \log_T(M_{threshold}^{L-1}) \rceil, & \frac{M_{threshold}^{L-1}}{T^L} \le M_{filters} \le M_{threshold}^{L-1} \\ L, & 0 \le M_{filters} \le \frac{M_{threshold}^{L-1}}{T^{L-1}} \end{cases} \quad \text{Eq. (18)}$$

$$M_{threshold}^{L-1} = \frac{N}{\ln(2)^2} \cdot \frac{\ln(T)}{T-1} \cdot \frac{1}{T}$$

$$M_{threshold}^L =$$
$$\begin{cases} \frac{N}{\ln(2)^2} \cdot \left(\frac{\ln(T)}{T-1} \cdot \frac{1}{T} \cdot \ln\left(\frac{1}{v+1}\right)\right) & \text{with leveling} \\ \frac{N}{\ln(2)^2} \cdot \left(\frac{\ln(T)}{T-1} \cdot \frac{1}{T} \cdot \ln\left(1 - \frac{v}{v+1} \cdot \frac{T}{T-1} \cdot \frac{1}{2}\right)\right) & \text{with tiering} \end{cases}$$

Predicting Performance

Referring again to FIG. 10A, the improved hybrid approach 1000 may then derive a closed-form equation relating the point lookup cost Z to the main memory budget $M_{filters}$ (in a step 1018). This may be achieved by plugging the optimal FPPs from Eqs. (14)-(17) into Eq. (4), simplifying into a closed-form, and rearranging in terms of Z. The results are given as Eqs. (19) and (20), which enable practitioners to determine precisely how much a given memory budget $M_{filters}$ improves the point lookup cost (in a step 1020).

Leveling

Eq. (19)

$$Z = \begin{cases} e^{-\frac{M_{filters}}{N} \cdot \ln(2)^2} \cdot T\frac{\frac{T}{T-1}}{T-1} \cdot \left(\frac{1}{v+1}\right)^{\frac{T-1}{T}} + \frac{v}{v+1}, & M_{threshold}^L \leq M_{filters} \\ e^{-\frac{M}{N} \cdot T^{L_{unfiltered}} \cdot \ln(2)^2} \cdot \frac{T\frac{T}{T-1}}{T-1} + L_{unfiltered}, & \text{otherwise} \end{cases}$$

Tiering

Eq. (20)

$$Z = \begin{cases} e^{-M_{filters} \cdot \ln(2)^2} \cdot T\frac{T}{T-1} \cdot \left(1 - \frac{v}{v+1} \cdot \frac{T}{T-1} \cdot \frac{1}{2}\right)^{\frac{T-1}{T}} + \frac{v}{v+1}, & M_{threshold}^L \leq M_{filters} \\ e^{-\frac{M}{N} \cdot T^{L_{unfiltered}} \cdot \ln(2)^2} \cdot T\frac{T}{T-1} + \left(L_{unfiltered} - 1 + \frac{1}{v+1}\right) \cdot (T-1) + \left\lceil\frac{T}{2}\right\rceil \cdot \frac{v}{v+1}, & \text{otherwise} \end{cases}$$

Figure 11:
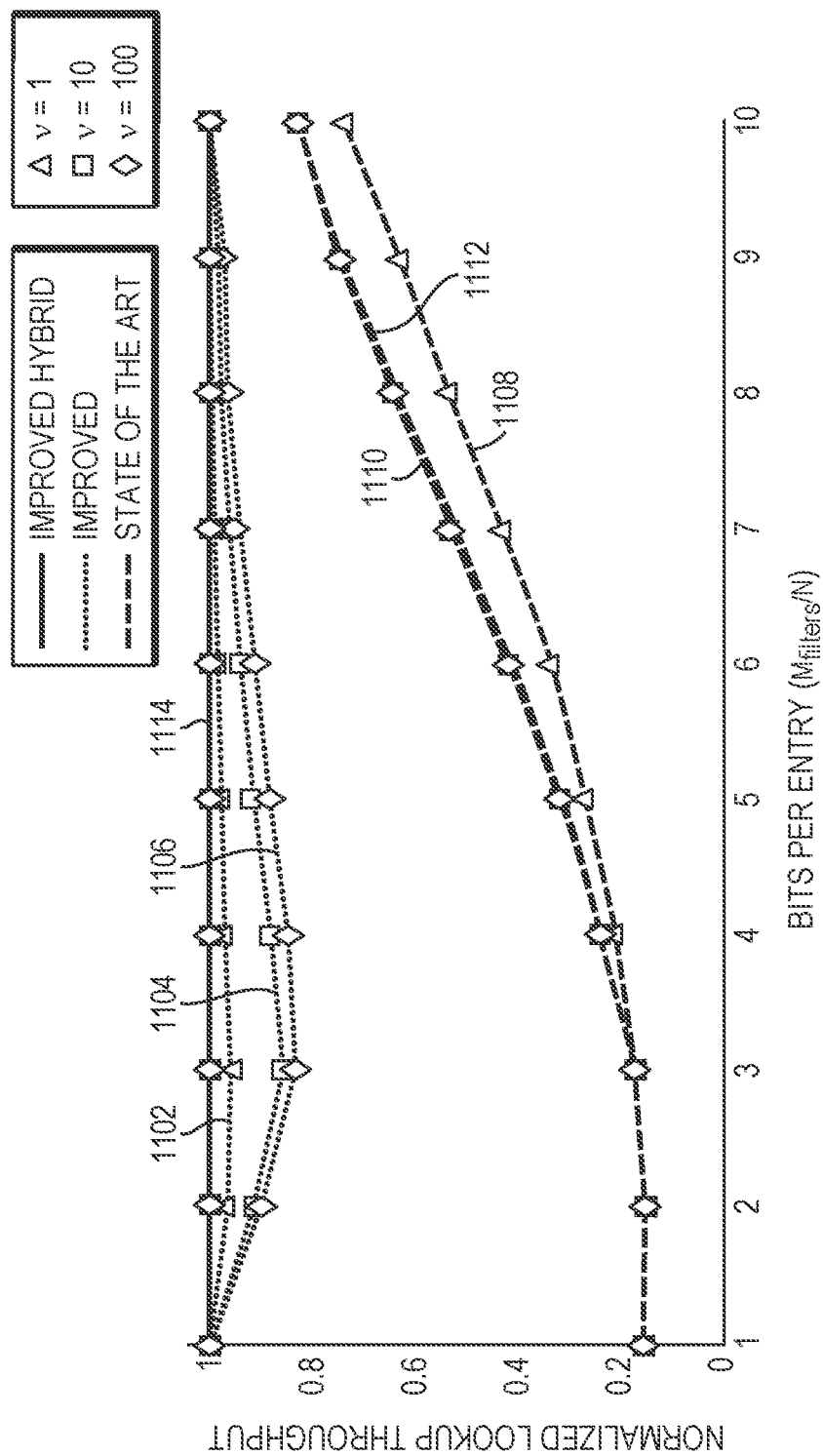
FIG. 11 illustrates the analytical comparison of lookup throughput in conventional systems and an improved hybrid approach in accordance with various embodiments.

FIG. 11 depicts the analytical comparison of the improved hybrid approach (labeled MonkeyHybrid) to the improved approach (labeled Monkey) and conventional systems in terms of lookup throughput for different amounts of memory and different proportions of the non-zero-result point lookups. To generate the curves 1102, 1104, 1106 for the improved approach, and the curves 1108, 1110, 1112 for conventional systems, Eqs. (7) and (12), respectively, are divided by Eq. (20) with the size ratio T set to 2. Performance is comparable across curves with the same markers but not for curves with different markers, as they are drawn for different workloads (i.e., different values of v). FIG. 11 shows that with 1 bit per element, the improved approach (curves 1102, 1104, 1106) and the improved hybrid approach (curve 1114) perform the same; this is because the FPR for the largest level had converged to one and the assignment of FPRs across all other levels is the same for both approaches. Otherwise, the improved hybrid approach 1000 dominates the improved approach 400 by up to approximately 20% because it allocates relatively more memory to filters at smaller levels to optimize for non-zero-result point lookups. In addition, as the proportion of non-zero-result point lookups in the workload increases, the improved hybrid approach 1000 dominates the improved approach 400 by increasing amounts. The improved hybrid approach 1000 and improved approach 400 both outperform conventional systems by up to approximately 60% and 80%, respectively.

Holistic Optimal Tuning of Merge Frequency and Memory Allocation between Filters and the Buffer In various embodiments, the improved approach 400 navigates the LSM-tree design space to maximize worst-case throughput by controlling four tuning parameters, including the merge policy (i.e., tiering vs. leveling), the size ratio, the amount of main memory allocated to the Bloom filters, and the amount of main memory allocated to the buffer. These parameters may be tuned with respect to the dataset (e.g., the number and size of entries), the workload (e.g., the proportion of lookups and updates), and the storage medium (e.g., the cost ratio between reads and writes, and the size of disk blocks). By modeling the worst-case throughput using these parameters, a tuning method may be devised to find the values of the parameters that maximize the throughput. FIG. 12A defines the new terms utilized in the tuning method.

Modeling Throughput

Figure 12B:
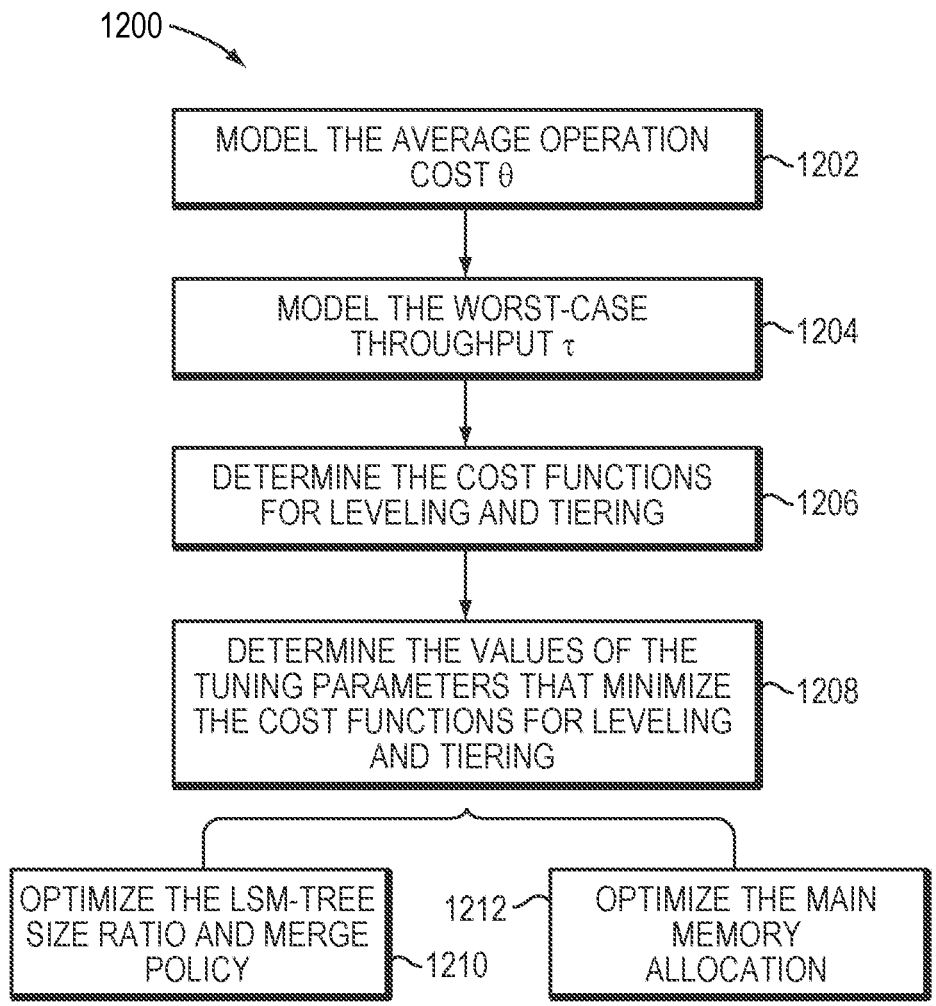
FIG. 12B is a flow chart of a tuning approach for finding the values of various impacting parameters so as to maximize the throughput in accordance with various embodiments.

Referring to FIG. 12B, in some embodiments, the tuning method 1200 first models the average operation cost θ by weighting the point lookup cost Z from Eqs. (19) and (20) (which model the zero and non-zero-result point lookup costs as described above), the range lookup cost Q from Eq. (11), and the update cost W from Eq. (10) based on their proportions in the workload represented by the terms z, q and w, respectively (step 1202). Note that z+q+w=1. In one implementation, the average operation cost θ is given as:

$$\theta = z \cdot Z + q \cdot Q + w \cdot W \quad \text{Eq. (21)}.$$

The worst-case throughput τ may then be modeled as the inverse of the product of the average operation cost θ multiplied by the secondary storage access latency Ω (step 1204), satisfying:

$$\tau = 1/(\theta \cdot \Omega) \quad \text{Eq. (22)}.$$

For a given workload, dataset, and underlying hardware (z, v, q, w, s, E, N, φ, B), Eq. (21) can be expressed as a function of the tuning $\{T, M_{buffer}, M_{filters}\}$ having one variation for leveling $\text{cost}_L(T, M_{buffer}, M_{filters})$ and one for tiering $\text{cost}_T(T, M_{buffer}, M_{filter})$ (step 1206):

$$\text{cost}_L(T, M_{buffer}, M_{filters}) = z \cdot Z_L(M_{filters}, T) + q \cdot Q_L(T, M_{buffer}) + w \cdot W_L(T, M_{buffer}) \quad \text{Eq. (23)};$$

$$\text{cost}_L(T, M_{buffer}, M_{filters}) = z \cdot Z_T(M_{filters}, T) + q \cdot Q_T(T, M_{buffer}) + w \cdot W_T(T, M_{buffer}) \quad \text{Eq. (24)}.$$

Optimal tuning is thus finding the values of the tuning parameters that minimize the cost functions and selecting the smaller between $\text{cost}_L$ and $\text{cost}_T$, which in turn maximizes worst-case throughput (step 1208).

Tuning Size Ratio and Merge Policy

In some embodiments, the tuning method 1200 can optimize the LSM-tree size ratio and merge policy in a design subspace where main memory allocation is fixed (step 1210). When main memory allocation is predetermined, the merge policy and size ratio are complementary means of navigating the same trade-off continuum. In one embodiment, a simple brute-force method is devised to check all the possible meaningful values of T, both for tiering and leveling, in order to find the tuning that minimizes the cost for fixed $M_{filters}$ and $M_{buffer}$. Instead of testing for all possible values of T, it may suffice to check the value of the cost for all values of T that correspond to an integer number of levels between 1 (the maximum value of $T_{lim}$=N/B) and [log$_2$(N/

B)] (the minimum value of T is 2). Therefore, the cost functions for both tiering and leveling for all T can be computed as $T=N^{1/L}$ for $L=1, 2, \ldots, [\log_2(N/B)]$. The tuning method then runs in O ($\log_2(N/B)$) steps.

Tuning Main Memory Allocation

The tuning approach 1200 may also be used as-is when the main memory allocation is predetermined. Conventional key-value systems frequently use a fixed amount of memory for the buffer, and the remaining memory goes to Bloom filters, often targeting using 10 bits per element. A rule-of-thumb where 95% of main memory is allocated for Bloom filters and 5% is allocated for the buffer has been used in conventional systems; this approach, however, may not optimize the main memory split. In various embodiments, the merge policy and frequency is first determined; optimization can then be solely performed for main memory allocation (step 1212). Subsequently, the two optimization steps may be combined by nesting the main memory allocation between the Bloom filters and the buffer with the merge frequency tuning.

Given the workload, the underlying hardware, the size ratio, and the merge policy, a new optimization problem may be formulated to decide how to split the available main memory between the Bloom filters and the buffer. In one implementation, the cost functions in Eqs. (23) and (24) are expressed as functions of memory for filters $M_f$ (where $M_f + M_{buffer} = \hat{M}$), T and $\hat{M}$. Optimal memory allocation is then formalized as finding the number of bits allocated to Bloom filters $M_f$ that minimizes the cost functions in Eqs. (25) and (26).

$$\text{cost}_L(M_f, T, \hat{M}) = z \cdot Z_L(M_f, T) + q \cdot Q_L(\hat{M} - M_f, T) + w \cdot W_L(\hat{M} - M_f, T) \quad \text{Eq. (25)};$$

$$\text{cost}_T(M_f, T, \hat{M}) = z \cdot Z_T(M_f, T) + q \cdot Q_T(\hat{M} - M_f, T) + w \cdot W_T(\hat{M} - M_f, T) \quad \text{Eq. (26)}.$$

The cost functions can then be refactored in order to be easier to manipulate their derivatives with respect to $M_f$.

$$\text{cost}_{L/T}(M_f) = \alpha_{L/T} \cdot e^{-\beta M_f} + \gamma_{L/T} \cdot \ln\left(\frac{\delta}{\hat{M} - M_f}\right) + C. \quad \text{Eq. (27)}$$

where $\alpha$ and $\gamma$ have different values for leveling and tiering, and $\beta$, $\delta$, and C have the same value for both tiering and leveling:

$$\alpha_L = z \cdot \frac{T\frac{T}{T-1}}{T-1} \cdot \left(\frac{1}{v+1}\right)^{\frac{T-1}{T}}, \quad \text{Eq. (28)}$$

$$\alpha_T = z \cdot T^{\frac{T}{T-1}} \cdot \left(1 - \frac{v}{v+1} \cdot \frac{T}{T-1} \cdot \frac{1}{2}\right)^{\frac{T-1}{T}};$$

$$\gamma_L = q + w \cdot \frac{(T-1) \cdot (1+\emptyset)}{2 \cdot B}, \quad \text{Eq. (29)}$$

$$\gamma_T = \frac{q \cdot (T-1) + w \cdot \frac{(T-1) \cdot (1+\emptyset)}{T \cdot B}}{\ln(T)};$$

$$\beta = \frac{(\ln(2))^2}{N}, \delta = N \cdot E \cdot \frac{T-1}{T}, C = z \cdot \frac{v}{v+1} + q \cdot s \cdot \frac{N}{B}. \quad \text{Eq. (30)}$$

Because the value of $M_f$ that minimizes Eq. (27) cannot be expressed analytically, in various embodiments, a quickly converging iterative Newton-Raphson method is implemented to determine the $M_f$ corresponding to the minimal cost. In one embodiment, this method runs in $$O\left(\log_{10}\left(\frac{\hat{M}}{B}\right)\right)$$

steps.

Holistic Tuning

Figure 13A:
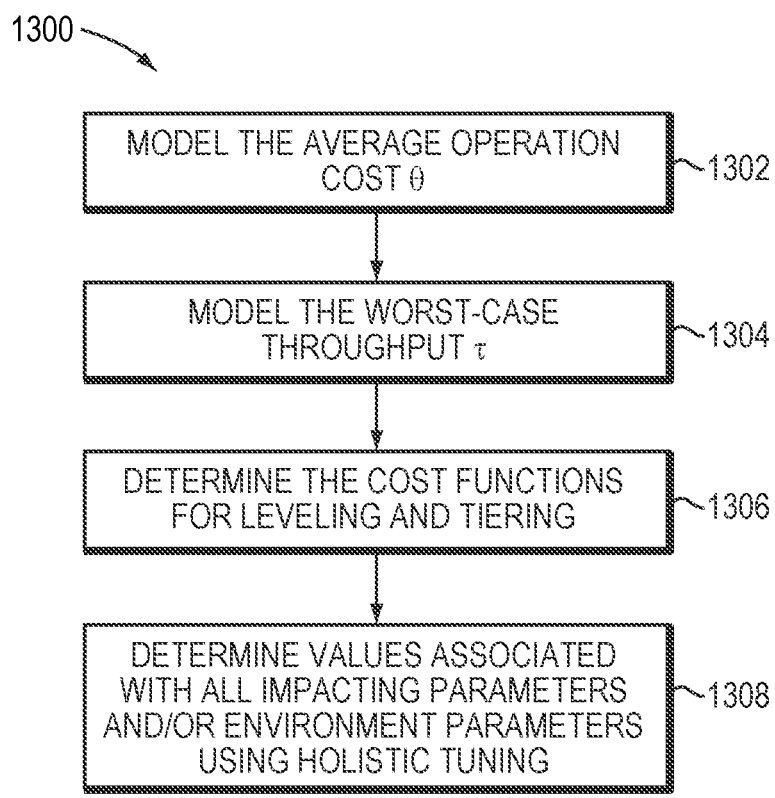
FIG. 13A is a flow chart of a holistic tuning approach for finding the values of various impacting parameters so as to maximize the throughput in accordance with various embodiments.
Figure 13C:
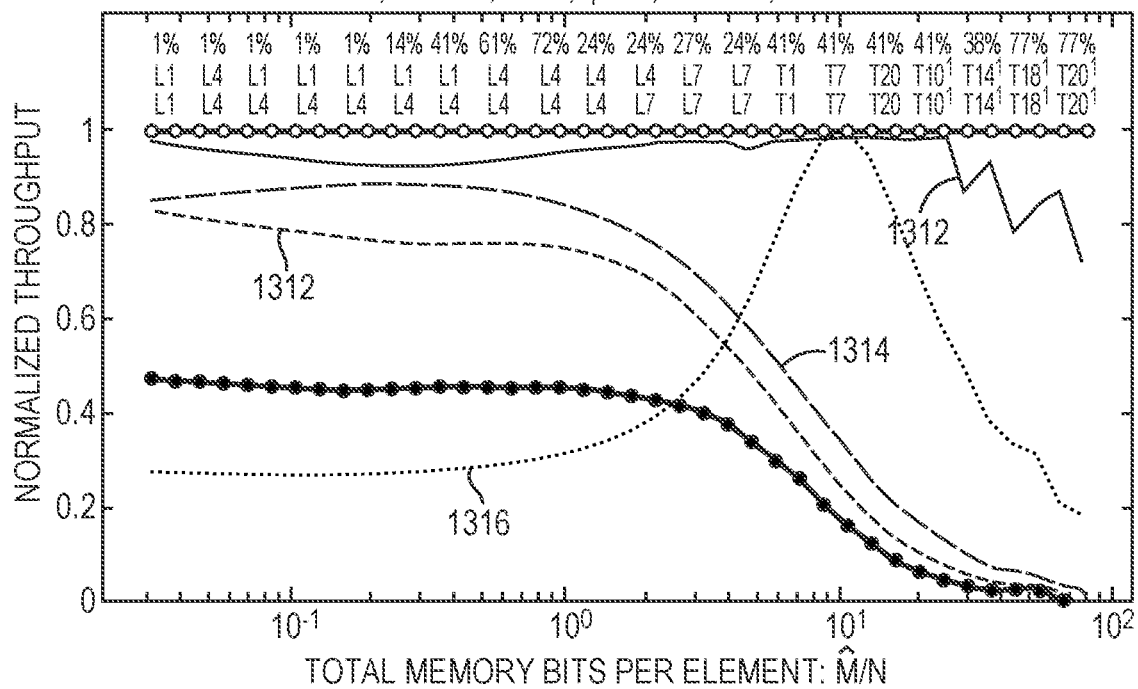
FIGS. 13C-13F illustrate the performance comparison of conventional systems with an improved holistic approach in accordance with various embodiments.
Figure 13D:
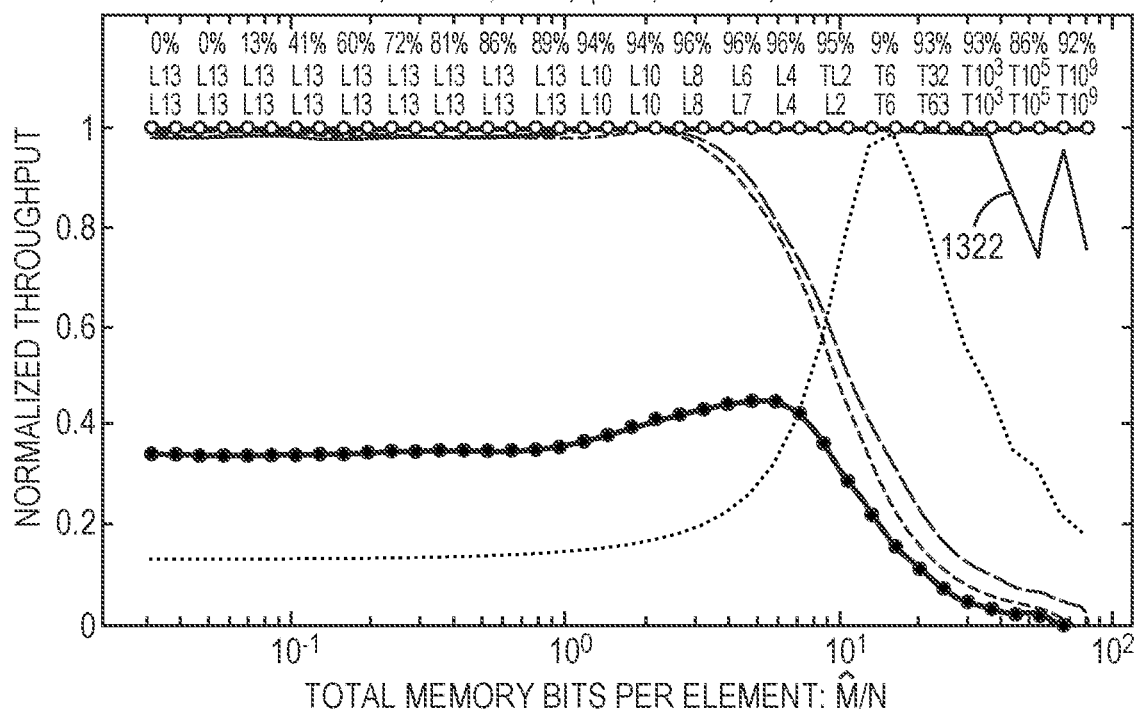
Figure 13E:
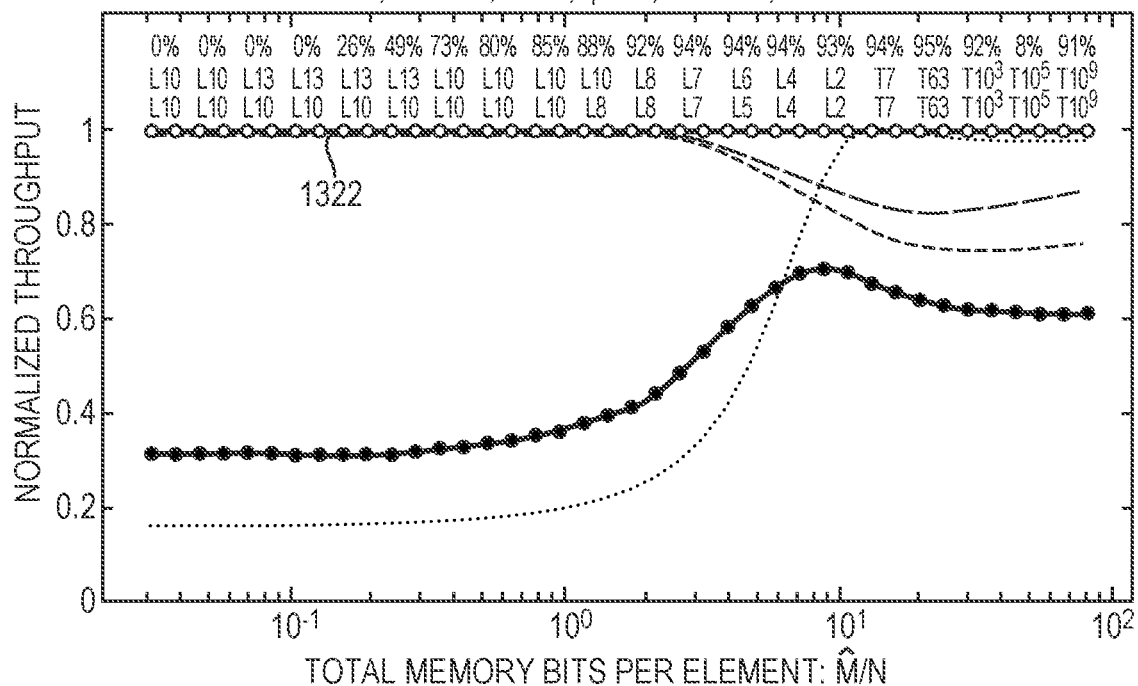
Figure 13F:
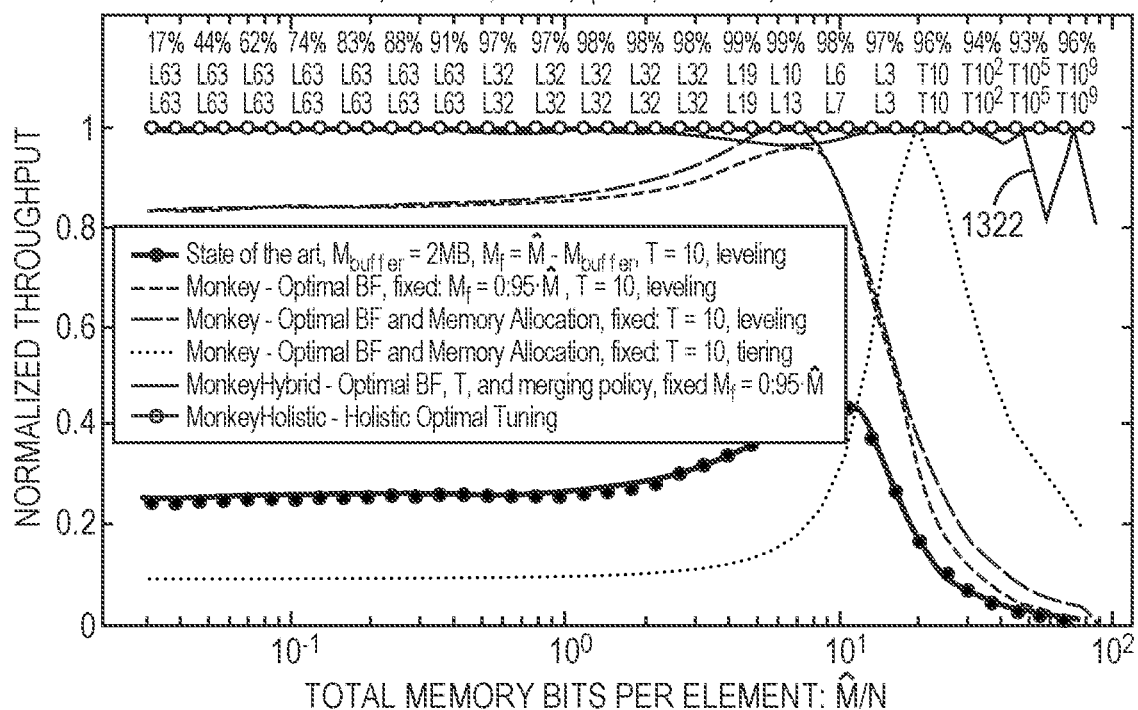

As described above, the tuning method 1200 includes two steps: first tuning for size ratio and merge policy (step 1210) and then tuning for main memory allocation (step 1212). This approach, however, may miss opportunities for deeper optimization where the interplay of main memory allocation, size ratio, and merging policy may provide an overall better result. Accordingly, referring to FIG. 13A, a holistic tuning approach (labeled "MonkeyHolistic") 1300 may be implemented to revisit the previous approach by adding the optimal main memory allocation between the Bloom filters and the buffer as a core part of the holistic optimization method. Every iteration of the holistic optimization method may include the search for the optimal memory allocation; as a result, the overall complexity of the holistic tuning process is $$O\left(\log_2\left(\frac{N}{B}\right) \cdot \log_{10}\left(\frac{\hat{M}}{B}\right)\right).$$

Impact of Holistic Tuning

The holistic tuning approach 1300 may offer the optimal tuning across all impacting parameters and/or environment parameters. FIGS. 13C-13F illustrate the performance comparison of the improved holistic approach (labeled MonkeyHolistic) with the improved approach (labeled Monkey) and conventional systems. Crucially, the different lines show how each optimization step towards the improved holistic approach affects the overall performance. In addition, each figure depicts the optimal values of the tuning parameters. For example, referring to FIG. 13C, the first point is tuned to "L4" and "0%;" this means that the optimal tuning is leveling with size ratio T=4, and the memory allocation for Bloom filters is 0%. The performance of conventional systems may be optimized by first using optimal Bloom filter allocation (dashed line 1312), and then by optimizing the memory allocation (solid line 1314), while still using conventional tuning method with respect to size ratio (e.g., T=10) and merge policy (e.g., leveling). As the total memory bits per element increase, the merge policy may use tiering instead; this is because most of the runs that do not contain useful data will not be read by more efficient Bloom filters (the dotted line 1316). Accordingly, to achieve the optimal performance, it may be necessary to select between leveling and tiering. Thus, the optimal performance of the improved approach (line 1322) may be achieved by optimizing for size ratio and merge policy and still maintaining the rule-of-thumb memory allocation. For read-heavy and read-mostly queries (depicted in FIG. 13D-13F), the 95%-5% rule-of-thumb gives close-to-optimal performance, except when the available memory increases to more than 20 bits per element. At this point, it is preferable to increase the size ratio aggressively and tune the memory between the buffer and the Bloom filter in a different manner. For a write-mostly workload (FIG. 13C), the line 1322 is slightly worse than optimal across the spectrum since it loses the opportunity to optimize for lower values of memory, where the optimal solution is to reduce memory allocation for filters down to 0% when needed. Therefore, to optimally tune an LSM-tree, it may be required to apply a multi-parametric optimization taking into account all possible design decisions at the same time (step 1308), as oppose to solving many optimization problems iteratively. In addition, the holistic tuning approach 1300 may also impose upper-bounds on lookup cost or update cost to support different service-level agreements (SLAs); if either the lookup or update cost exceeds an imposed upper-bound, the holistic tuning approach 1300 may discard the configurations.

Experimental Analysis

Performance of the improved approach described herein may be experimentally evaluated against the performance of conventional systems. As demonstrated below, compared to conventional systems, the improved approach may significantly reduce lookup cost across the whole design space and for various workloads by tuning the Bloom filters. In addition, the improved approach may allow navigation in the LSM-tree design space in order to find the design that maximizes throughput for a given application workload.

1) Experimental Setup

For experimentation, a machine having a 500 GB 7200 RPM disk, 32 GB DDR4 main memory, and 4 2.7 GHz cores with 8 MB L3 cache is used. The machine is running 64-bit Ubuntu 16.04 LTS, and the experiments are run on an ext4 partition with journaling turned off.

2) Implementation

In various embodiments, the improved approach described above is implemented on top of LevelDB, which is a well-known and widely used LSM-tree-based key-value system, representative of conventional systems. The conventional implementation of LevelDB includes a fixed point in the design space; it only supports leveling as a merge policy, has a fixed, hard-coded size ratio, and assigns the same FPR to filters across all levels. The improved approach is implemented by adding support for tiering, and having different size ratios and optimal FPRs for filters across different levels. To enable the comparison, in all experiments, the improved approach only differs from LevelDB in how it allocates Bloom filters, and the same default values are used for all other parameters. The default configuration includes a size ratio of 2 (i.e., the size ratio at which leveling and tiering behave identically), a buffer size of 1 MB, an overall amount of main memory allocated to all Bloom filters being $$\frac{M_{filters}}{N} = 5$$

bits per element (though the improved approach may allocate these bits differently across different levels). These parameters are varied one at a time to compare across a wide range of the design space. Similar to recent versions of RocksDB, the direct I/O is implemented to enable full control of the memory budget. In addition, all reported experiments are set with the block cache of LevelDB and the improved approach disabled. This represents a worst case scenario where there is not enough memory for a cache and thus allows assessment of the impact of the improved approach on the pure LSM-tree structure. (Although not shown here, the improved approach maintains its advantages when there is enough memory to devote to a block cache.)

3) Default Set-up

In some embodiments, the database is initially empty. Then 1 GB of key-value entries, each having 1 KB in size, are inserted into the database; the entries are uniformly randomly distributed across the key space and inserted at a random order. After the initialization phase, 16K zero-result point lookups that are uniformly randomly distributed across the key space are issued. Several variations of this set-up with different data sizes and query workloads may be optionally repeated.

4) Metrics

Each experimental trial (data loading and queries) is repeated three times. For each trial, the average lookup latency and the number of I/Os per lookup are measured. The error bars in the figures represent one standard deviation for lookup latency across trials.

5) The Improved Approach Scales Better with Data Volume

The first experiment is set up by repeating the default experimental setup multiple times, each time using more data entries. As shown in FIG. 14A, a lookup latency 1402 for the LevelDB increases at a logarithmic rate as the number of data entries increases. This is because with more data entries, the number of levels in conventional LSM-tree system increases at a logarithmic rate, and the lookup latency for LevelDB is proportional to the number of levels. In contrast, the improved approach maintains a stable lookup latency 1404 when the number of entries increases. This is because the improved approach assigns exponentially decreasing FPRs to filters at lower levels, and the average number of I/Os per lookup converges to a constant that is independent of the number of levels. As illustrated, the improved approach dominates LevelDB by up to 80%, and its margin of improvement increases as the number of entries grows. The horizontal dotted line 1406 shows how the lookup latency corresponds to disk I/Os. The average number of I/Os per lookup is lower than one because the lookups target non-existing keys, and they do not issue I/Os most of the time due to the filters.

FIG. 14B depicts the results for a similar experiment as that of FIG. 14A, but the difference is that this time the number of data entries is fixed and the entry size is increased. The same impact on performance occurs for the same reasons as described above.

6) The Improved Approach Needs Less Main Memory

In one embodiment, the second experiment is set up by repeating the default experimental setup multiple times, each time using a different number of bits-per-entry ratio allocated to the filters. As depicted in FIG. 14C, when the number of bits per entry is set to 0, both the improved approach and LevelDB degenerate into an LSM-tree with no filters; thus the lookup cost is the same. But as the number of bits per entry is increased, the improved approach (line 1408) significantly reduces lookup latency. Eventually, the filters for both systems become so accurate that the number of I/Os drops to nearly 0, at which point the curves nearly converge. Thus, the improved approach may be able to match the performance of LevelDB with a smaller memory footprint (up to 60% smaller in this experiment, though the asymptotic improvement implies that the margin of improvement increases as a function of the number of entries).

7) The Improved Approach Improves Lookup Cost for Different Workloads

In addition, the improved approach may significantly improve the lookup latency for non-zero-result lookups across a wide range of temporal locality in the query workload. To control temporal locality, a coefficient c (c percent of the most recently updated entries receive (1−c) percent of the lookups) is first defined; c has a range from 0 to 1. When c is set to 0.5, the workload is uniformly randomly distributed. When c is above 0.5, recently updated entries receive most of the lookups; and when c is below 0.5, the least recently updated entries receive most of the lookups. In various embodiments, the experiment is set up by repeating the default experimental setup multiple times, with the difference that during the query phase, the lookups are issued to existing keys based on the temporality coefficient.

Figures 14D, 14E, 14F:
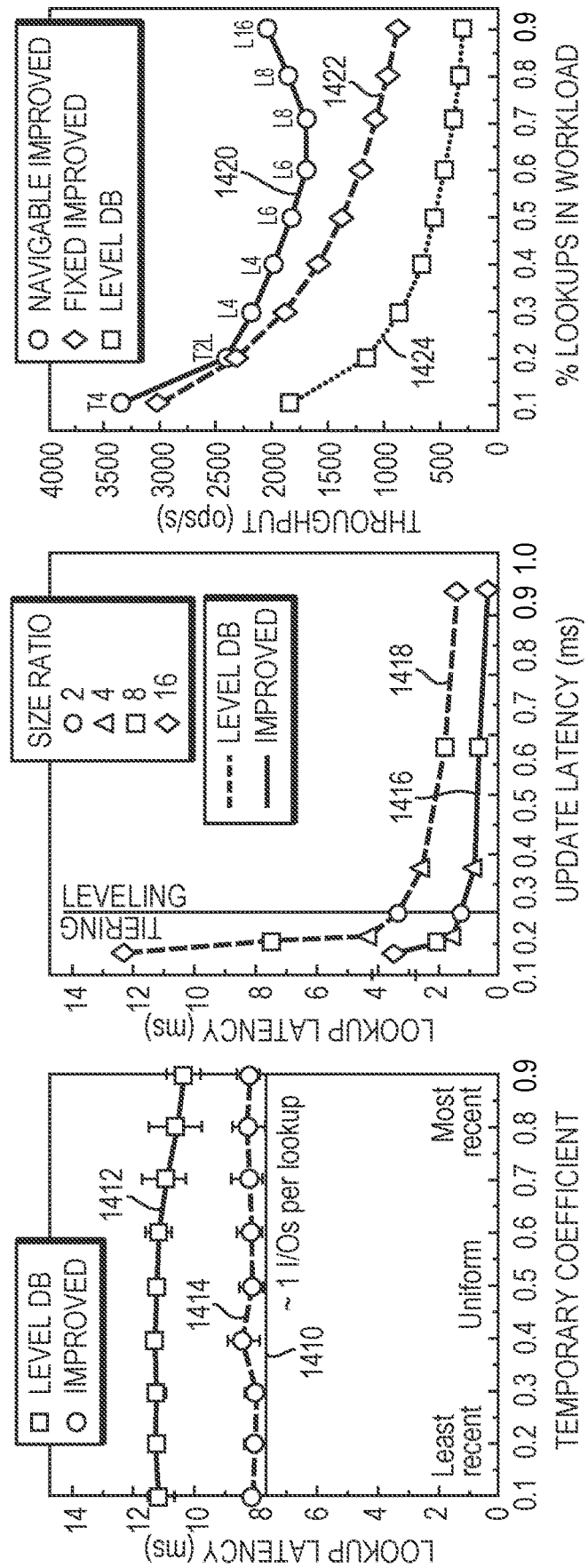

FIG. 14D depicts that for both the improved approach and LevelDB, each lookup involves at least one I/O for the target key, and so the lookup latency includes at least one disk seek. This source of latency is marked using a dotted line 1410 representing the approximate time to perform one seek on the hard disk. Any contribution to the latency above this line arises due to false positives. FIG. 14D shows that the lookup latency for both the improved approach and LevelDB is largely insensitive to temporal locality. The reason is that in an LSM-tree, the most recently updated entries are at the shallower levels, which have exponentially lower capacities than the largest level. Thus, even a lookup for the most recently updated 10% of the entries has to probe most levels on average. The curve 1412 for LevelDB slightly decreases as temporal locality increases; this is because a lookup traverses fewer levels on average before finding the target key and terminating, and fewer false positives may take place. For the improved approach, the lookup latency 1414 is even less sensitive to temporal locality. This is because all levels but the last one have significantly lower FPRs than for LevelDB. Even when temporal locality increases, a lookup traverses fewer levels on average before terminating, the low FPRs at these lower levels mean that the false positives are rare, and so they contribute very modestly to latency in all cases. In this way, the improved approach may reduce the lookup latency by up to 30% in this experiment for non-zero-result lookups across a wide range of temporal locality in the query workload.

8) The Improved Approach Reaches the Pareto Curve

Further, the improved approach may reach the Pareto frontier and is therefore able to navigate a better trade-off continuum between the update cost and zero-result lookup cost. The experiment is set up by repeating the default experimental setup multiple times; each time having a different configuration of the size ratio and merge policy. The average latencies of the lookups and updates for the improved approach and LevelDB are shown in FIG. 14E. As depicted, for any configuration, the improved approach achieves a significantly lower lookup cost than LevelDB due to the tuning of the Bloom filters. Thus, the improved approach shifts the trade-off curve downwards to the Pareto frontier. As a result, the improved approach may reduce the lookup cost by up to 60%, and this gain can be traded for an improvement of up to 70% in the update cost by adjusting the size ratio and merge policy to become more update-friendly.

9) The Improved Approach Navigates the Design Space to Maximize Throughput

In some embodiments, the improved approach provides ability to navigate the LSM-tree design space to find a configuration that maximizes throughput for a given application workload. To demonstrate this advantage, the default experimental setup may be repeated multiple times, with the difference that during the query processing phase, the ratio of the zero-result lookups to updates is varied from 10% to 90%. Two instances of the improved approach are compared against LevelDB. The first (labeled Fixed Monkey) is the default configuration of the improved approach (labeled Monkey); the second (labeled Navigable Monkey) is the full version that navigates the design space to find the merge policy to size ratio that gives the balance between the lookup cost and update cost (and the corresponding optimal Bloom filters' allocation) that maximizes throughput. LevelDB and the first instance have a fixed size ratio of 2 (i.e., the point in the space at which leveling and tiering behave identically). FIG. 14F illustrates that the curve 1420 for the second instance is bell-shaped. The reason is that the more extreme the workload tends towards one operation type, the more possible it is to achieve a higher throughput as a single configuration handles most operations well. Overall, the first instance 1422 significantly improves upon LevelDB 1424, and the second instance significantly 1420 improves on the first instance 1422. Accordingly, the second instance more than doubles throughput relative to LevelDB by being able to reach the Pareto curve and to navigate the design space.

Implementing the Improved Approach with Conventional Systems

Similar to conventional key-value systems utilizing LSM-trees, the improved approach described herein uses Bloom filters in main memory to probabilistically enable lookups to skip probing runs of the LSM-tree that do not contain a target key. While conventional systems assign the same FPR to every Bloom filter regardless of the size of the run that it corresponds to, various embodiments of the improved approach minimize the sum of FPRs by setting the FPR for each Bloom filter to be proportional to the number of entries in the run that it corresponds to (meaning that runs at the shallower levels have exponentially lower FPRs). This may significantly reduce the asymptotic complexity of the worst-case lookup cost, and in practice it reduces the lookup latency by at least 50%-80%.

In addition, conventional key-value systems utilizing LSM-trees do not allow easy trade among the lookup cost, update cost and main memory footprint. For example, LevelDB hard-codes the size ratio between levels to 10 with leveled compaction; RocksDB and LSM-tree only enable leveled or tiered compaction, respectively, and they use a fixed number of bits per element for all Bloom filters. WiredTiger supports dynamic values for the size ratio having as a starting point 15, however, it also uses a fixed number of bits per element for all Bloom filters (setting as default 16 bits per element). In addition, the balance between the lookup cost, update cost and main memory footprint may depend on a combination of interdependent tuning and environmental parameters that must be precisely co-tuned. In this way, tuning in conventional key-value systems becomes effectively a trial-and-error process depending on intuition and experience of highly qualified engineers. The improved approach described herein allows this process to be performed more automatically and more easily. More particularly, various embodiments expose critical tuning parameters that influence the worst-case lookup cost, update cost, and main memory footprint. Moreover, various embodiments use the novel worst-case closed-form models described above to enable optimizing throughput and answering what-if questions regarding how changes in environmental parameters affect performance. Further, in some embodiments, both lookup cost and update cost are modeled under both leveled and tiered LSM-trees; this enables a holistic tuning over the entire design space.

Generally, conventional key-value systems spread the work done by merge operations over time in order to maintain stable performance. Some systems pace merge operations directly with respect to application updates; others partition a run into multiple files (i.e., often called Sorted String Tables or SSTables for short) and merge one file at a time with the set of files in the next level that have overlapping ranges; and still other systems merge runs on dedicated servers. Since the improved approach described herein focuses on the total amount of work done by merge operations rather than how this work is scheduled, any of the above conventional techniques may be used in conjunction with the improved approach.

To reduce the volume of data that is copied during merge operations, some conventional systems (e.g., WiscKey) decouple values from keys and store values on a separate log. This technique is compatible with the core design of the improved approach described herein, but it may require adapting the cost models to account for (i) only merging keys, and (ii) having to access the log during lookups. Another conventional system (e.g., VT-tree) proposes to avoid including portions of runs that do not overlap during merge operations; this technique is used in major key-value systems, where an SSTable is simply moved to the next level if there are no SSTables in the next level with overlapping key-ranges. This technique may be taken advantage of in the present invention by implementing the improved approach on top of LevelDB.

In addition, some conventional key-value systems, such as Redis and Memcached, store application data in main memory rather than persistently in secondary storage. Because various embodiments described herein focus on mapping the design space of persistent key-value systems, the improved approach is orthogonal to in-memory efforts. However, given that similar trade-offs exist in a pure in-memory environment for minimizing cache-misses, mapping the design space of in-memory key-value systems may also be beneficial.

In sum, the improved LSM-based key-value approach described herein may advantageously reach the Pareto performance curve by allocating the Bloom filters so as to minimize the worst-case lookup cost. In addition, the improved approach uses a closed-form model to navigate the design space to find the holistic tuning that maximizes throughput under a given main memory budget, application workload, and storage medium.

Representative Architecture

Figure 15:
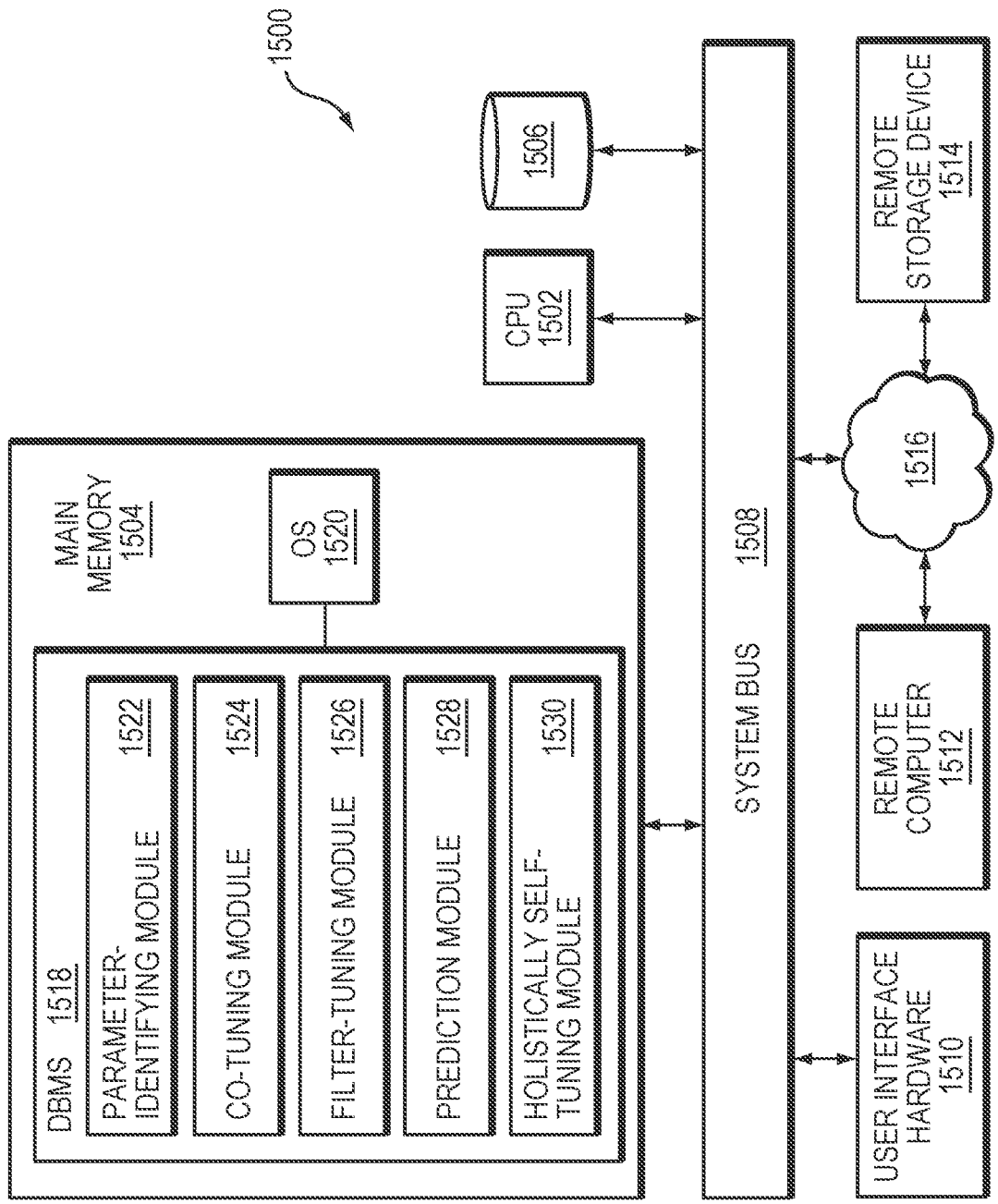
FIG. 15 is a block diagram illustrating a facility for performing an improved key-value approach in accordance with various embodiments.

Approaches for performing an optimal balance between the costs of updates and lookups with a given main memory budget in accordance herewith can be implemented in any suitable combination of hardware, software, firmware, or hardwiring. FIG. 15 illustrates an exemplary embodiment utilizing a suitably programmed general-purpose computer 1500. The computer includes a central processing unit (CPU) 1502, at least a main (volatile) memory 1504 having a file buffer and multiple Bloom filters, each associated with a memory access run, and non-volatile mass storage devices 1506 (such as, e.g., one or more hard disks and/or optical storage units) for storing various types of files. The computer 1500 further includes a bidirectional system bus 1508 over which the CPU 1502, main memory 1504, and storage devices 1506 communicate with each other and with internal or external input/output devices, such as traditional user interface components 1510 (including, e.g., a screen, a keyboard, and a mouse) as well as a remote computer 1512 and/or a remote storage device 1514 via one or more networks 1516. The remote computer 1512 and/or storage device 1514 may transmit any information (e.g., keys and/or values associated with various applications) to the computer 1500 using the network 1516.

In some embodiments, the computer 1500 includes a database management system (DBMS) 1518, which itself manages reads and writes to and from various tiers of storage, including the main memory 1504 and secondary storage devices 1506. The DBMS 1518 establishes, and can vary, operating parameters including the size ratio among levels, the merge policy, the FPR assigned to Bloom filters across different levels, and the allocation of main memory between the buffer and the filters as described above. The DBMS 1518 may be implemented by computer-executable instructions (conceptually illustrated as a group of modules and stored in main memory 1504) that are executed by the computer 1500 so as to control the operation of CPU 1502 and its interaction with the other hardware components.

In addition, an operating system 1520 may direct the execution of low-level, basic system functions such as memory allocation, file management and operation of the main memory 1504 and/or mass storage devices 1506. At a higher level, one or more service applications provide the computational functionality required for implementing the improved key-value approach described herein. For example, as illustrated, upon receiving a query from a user via the user interface 1510 and/or from an application in the remote computer 1512 and/or the computer 1500, the system 1520 may assess the main memory 1504 and/or secondary storage devices 1506 to look up the target key as described above. Upon finding the target key, the system 1520 may assess the data that is identified by the target key; the data may be stored in a database (not shown) associated with the main memory 1504, secondary storage devices 1506, remote computer 1512 and/or remote storage device 1514. To speed up the lookup process using the improved LSM-based approach described above, in various embodiments, a parameter-identifying module 1522 first identifies parameters that may impact the worst-case I/O cost as described in step 402. A co-tuning module 1524 may then tune the values of the identified parameters so as to optimize throughput and/or favor one performance metric over another as described in step 404. For example, a filter-tuning module 1526 may tune the Bloom filters across various levels differently to minimize the cost of zero- and/or non-zero-result point lookups. In one embodiment, the filter-tuning module 1526 models the total main memory footprint for the Bloom filters in terms of the FPRs of the different levels. In addition, the filter-tuning module 1526 may compute the average worst-case lookup cost and the main memory footprint for any assignment of FPRs across the different levels as described above. In some embodiments, the filter-tuning module 1526 also determines the optimal number of levels $L_{filtered}$ to which Bloom filters are allocated and subsequently sets the FPR for each level to be proportional to its capacity. In various embodiments, the filter-tuning module 1526 further models the cost of non-zero-result point lookups. For example, the filter-tuning module 1526 may introduce a constant v to represent a ratio between the non-zero-result lookups to the zero-result lookups in the workload and then weigh the costs of the zero and non-zero-result lookups using the ratio v. The filter-tuning module 1526 may then optimize the FPRs across different levels. To achieve this, in one implementation, the filter-tuning module 1526 first derives the FPR for the largest level L and then derives the optimal FPRs for smaller levels. Subsequently, the filter-tuning module 1526 may determine the memory thresholds $M_{threshold}^{L}$ and $M_{threshold}^{L-1}$ at which the FPRs at the largest and second largest levels converge to one and then compute the optimal number of levels having no Bloom filters. In various embodiments, after the FPRs across different levels are optimized, the filter-tuning module 1526 derives a closed-form equation relating the point lookup cost Z to the main memory budget $M_{filters}$; it can then determine how to improve the point lookup cost based on a given memory budget $M_{filters}$.

In addition, the DBMS may include a prediction module 1528 that can derive one or more closed-form models to predict the effect on the worst-case performance. For example, the prediction module 1528 may first derive a closed-form expression for the zero-result lookup cost R, model (i) the average worst-case cost V of a non-zero-result lookup that finds the target key in the oldest run, (ii) the worst-case update cost W, (iii) the worst-case range lookup cost, Q, and then generate a design space of the improved LSM-trees based approach. In some embodiments, the prediction module 1528 may further compare the design space of the improved approach against that of conventional key-value systems as described above.

In various embodiments, the DBMS may further include a holistically self-tuning module 1530 for determining the values of various impacting parameters and/or environmental parameters so as to maximize the throughput. For example, the holistically self-tuning module 1530 may model the average operation cost θ and the worst-case throughput r as described above. Based thereon, the holistically self-tuning module 1530 may determine the cost functions for leveling and tiering and then determine the values of the tuning parameters that minimize the cost functions for both leveling and tiering. In one embodiment, the holistically self-tuning module 1530 first optimizes the LSM-tree size ratio and merge policy, and then optimizes the main memory allocation. In another embodiment, the holistically self-tuning module 1530 performs a multi-parametric optimization by taking into account all possible impacting parameters and/or environment parameters at the same time and then determines values associated with all parameters using holistic tuning.

Generally, program modules 1522-1530 include routines, programs, objects, components, data structures, etc. that performs particular tasks or implement particular abstract data types. Those skilled in the art will appreciate that the invention may be practiced with various computer system configurations, including multiprocessor systems, microprocessor-based or programmable consumer electronics, mini-computers, mainframe computers, and the like. The invention may also be practiced in distributed computing environments where tasks are performed by remote processing devices that are linked through a communications network. In a distributed computing environment, program modules may be located in both local and remote computer-storage media including memory storage devices.

In addition, the CPU 1502 may comprise or consist of a general-purpose computing device in the form of a computer including a processing unit, a system memory, and a system bus that couples various system components including the system memory to the processing unit. Computers typically include a variety of computer-readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

The CPU 1502 that executes commands and instructions may be a general-purpose processor, but may utilize any of a wide variety of other technologies including special-purpose hardware, a microcomputer, mini-computer, mainframe computer, programmed micro-processor, micro-controller, peripheral integrated circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), smart chip, or any other device or arrangement of devices that is capable of implementing the steps of the processes of the invention.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

More generally, the computer shown in FIG. 15 is representative only and intended to provide one possible topology. It is possible to distribute the functionality illustrated in FIG. 15 among more or fewer computational entities as desired. The network 1516 may include a wired or wireless local-area network (LAN), wide-area network (WAN) and/or other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI, for example. For wireless communications, communications protocols may include the cellular telecommunications infrastructure, WiFi or other 802.11 protocol, Bluetooth, Zigbee, IrDa or other suitable protocol. Furthermore, components of the system may communicate through a combination of wired or wireless paths.

Any suitable programming language may be used to implement without undue experimentation the analytical functions described within. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of the system and method of the invention. Rather, any number of different programming languages may be utilized as is necessary or desirable.

The terms and expressions employed herein are used as terms and expressions of description and not of limitation, and there is no intention, in the use of such terms and expressions, of excluding any equivalents of the features shown and described or portions thereof In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A database system comprising:
a main memory comprising volatile storage and including a plurality of Bloom filters each associated with a memory access run;
a secondary store comprising nonvolatile storage for storing files;
memory containing a log-structured merge-tree (LSM tree) providing indexed access to files stored in the memory and the secondary store, the LSM tree being organized into levels and indexing the files as key-value pairs;
a processor for writing files to and reading files from the main memory and the secondary store in runs each having a size, the processor being configured to limit the runs associated with a read or write operation in accordance with the Bloom filters,
wherein the Bloom filters are tuned to minimize a sum of false positive rates thereacross.

2. A method for providing an improved key-value storing system, the method comprising:
providing a main memory comprising volatile storage and including a plurality of Bloom filters each associated with a memory access run;
providing a secondary store comprising nonvolatile storage for storing files;
providing memory containing a log-structured merge-tree (LSM tree) having indexed access to files stored in the memory and the secondary store, the LSM tree being organized into levels and indexing the files as key-value pairs;
using a processor to write files to and read files from the main memory and the secondary store in runs each having a size, the processor being configured to limit the runs associated with a read or write operation in accordance with the Bloom filters; and
tuning the Bloom filters to minimize a sum of false positive rates thereacross.

3. The system of claim 1, wherein each of the files comprises a plurality of data entries and each of the runs (i) is associated with a specific level and (ii) comprises approximately equal numbers of data entries.

4. The system of claim 1, wherein the processor is further configured to computationally predict relationships between a plurality of environmental parameters and a lookup cost for a target key, wherein the Bloom filters are tuned based at least in part on the predicted relationships.

5. The system of claim 1, wherein the processor is further configured to predict relationships between a plurality of system design parameters and a lookup cost for a target key, wherein the Bloom filters are tuned based at least in part on the predicted relationship.

6. The system of claim 3, wherein each of the Bloom filters associated with runs at a particular level is assigned the same false positive rate.

7. The system of claim 3, wherein the processor is further configured to model an average number of the memory access runs probed by a lookup for a target key, wherein the Bloom filters are tuned based at least in part on the modeled number.

8. The system of claim 3, wherein the processor is further configured to compute a first cost associated with a zero-result lookup for a target key and a second cost associated with a non-zero-result lookup for the target key, wherein the Bloom filters are tuned based at least in part on the computed first and second costs.

9. The system of claim 4, wherein the environmental parameters comprise a main memory budget, a proportion of reads and writes in a workload, a number of data entries associated with the files, and/or a size of the data entries.

10. The system of claim 5, wherein the system design parameters comprise a size ratio among the levels of the LSM tree, a merge policy, the false positive rates assigned to the Bloom filters across different levels, and/or an allocation of the main memory between the memory and the Bloom filters.

11. The system of claim 6, wherein the false positive rates across levels are assigned so as to minimize an amount of memory utilized by the Bloom filters.

12. The system of claim 6, wherein the processor is further configured to determine a number of the levels to which the Bloom filters are allocated, the false positive rate for each number of the levels being assigned based on a capacity thereof.

13. The system of claim 6, wherein the false positive rate assigned to each Bloom filter is proportional to a number of data entries in the memory access run corresponding to the Bloom filter.

14. The system of claim 7, wherein the average number of the memory access runs corresponds to the sum of the false positive rates.

15. The system of claim 8, wherein the false positive rates across the levels are assigned so as to minimize the first and second costs.

16. The system of claim 10, wherein the processor is further configured to holistically tune the system design parameters so as to minimize the lookup cost.

* * * * *